(12) United States Patent
Bani Shamseh

(10) Patent No.: US 11,777,403 B2
(45) Date of Patent: Oct. 3, 2023

(54) CONTROL DEVICE FOR POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Mohammad Bani Shamseh, Tokyo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 17/755,072

(22) PCT Filed: Oct. 5, 2020

(86) PCT No.: PCT/JP2020/037758
§ 371 (c)(1),
(2) Date: Apr. 20, 2022

(87) PCT Pub. No.: WO2022/074715
PCT Pub. Date: Apr. 14, 2022

(65) Prior Publication Data
US 2022/0399802 A1    Dec. 15, 2022

(51) Int. Cl.
*H02M 1/32* (2007.01)
*H02M 1/00* (2006.01)
*H02M 1/084* (2006.01)

(52) U.S. Cl.
CPC .......... *H02M 1/325* (2021.05); *H02M 1/0009* (2021.05); *H02M 1/0087* (2021.05); *H02M 1/084* (2013.01)

(58) Field of Classification Search
CPC ............ G01R 19/165; G01R 19/16504; G01R 19/16509; G01R 19/16514;
(Continued)

(56) References Cited

U.S. PATENT DOCUMENTS 5,038,092 A * 8/1991 Asano ............... H02M 7/53875
                                                      318/806
5,841,263 A * 11/1998 Kaneko ............... H02P 21/0085
                                                      318/632
(Continued)

OTHER PUBLICATIONS

International Search Report and Written Opinion dated Dec. 28, 2020 in PCT/JP2020/037758 filed on Oct. 5, 2020, 12 pages.
(Continued)

*Primary Examiner* — Thienvu V Tran
*Assistant Examiner* — Nusrat Quddus
(74) *Attorney, Agent, or Firm* — Oblon, McClelland, Maier & Neustadt, L.L.P.

(57) ABSTRACT

An elevator monitoring device that can compensate for system voltage when an unbalanced short circuit occurs. A control device for a power conversion device includes: a current command value generator configured to generate a provisional normal phase d-axis current command value, a provisional normal phase q-axis current command value, a provisional reversed phase d-axis current command value, and a provisional reversed phase q-axis current command value to compensate for an alternating current (AC)-side voltage of a power converter; a limiter configured to respectively set limit values of a provisional normal phase d-axis current command value, a provisional normal phase q-axis current command value, a provisional reversed phase d-axis current command value, and a provisional reversed phase q-axis current command value so that the AC-side current value of the power converter does not exceed a preset value; and a controller configured to control the power converter within the limit values.

6 Claims, 14 Drawing Sheets

(58) Field of Classification Search
CPC ........ G01R 19/16519; G01R 19/16523; G01R
19/16528; G01R 19/16533; G01R
19/16538; G01R 19/16542; G01R
19/16547; G01R 19/16552; G01R
19/16557; G01R 19/16561; G01R
19/16566; G01R 19/16571; G01R
19/16576; G01R 19/1658; G01R
19/16585; G01R 19/1659; G01R
19/16595; G01R 19/17; H02H 7/122;
H02H 7/1222; H02H 7/1225; H02H
7/1227; H02H 7/125; H02H 7/1252;
H02H 7/1255; H02H 7/1257; H02H
7/261; H02H 7/268; H02M 3/073; H02M
3/10; H02M 3/135; H02M 3/137; H02M
3/28; H02M 3/315; H02M 3/3155; H02M
3/325; H02M 3/335; H02M 7/10; H02M
7/515; H02M 7/521; H02M 7/53; H02M
7/537; H02M 7/5383; H02M 7/538466;
H02M 7/53862; H02M 7/5387; H02M
7/53871; H02M 7/53875; H02M 7/757;
H02M 7/79; H02M 3/337; H02M 3/338;
H02M 3/3382; H02M 3/3384; H02M
7/538; H02M 7/53806; H02M 7/53832;
H02M 7/53835; H02M 7/487; H02M
7/539; H02M 7/23; H02M 7/217; H02M
7/21; H02M 7/12; H02M 7/04; H02M
7/00; H02M 5/40; H02M 5/42; H02M
5/453; H02M 7/7575; H02M 5/458;
H02M 5/45; H02M 5/4585; H02M
5/4505; H02M 5/451; H02M 5/452;
H02M 5/447; H02M 5/456; H02M 1/12;
H02M 1/4266; H02M 2001/123; H02J
3/36; H02J 3/01
See application file for complete search history.

(56) References Cited

U.S. PATENT DOCUMENTS

| | | | | |
|---|---|---|---|---|
| 5,909,366 A * | 6/1999 | Sanada | ............. | H02M 7/53875 363/17 |
| 6,008,617 A * | 12/1999 | Kaneko | ................... | H02P 21/06 318/632 |
| 6,052,297 A * | 4/2000 | Akamatsu | ............. | H02J 3/1842 363/84 |
| 6,741,063 B2 * | 5/2004 | Sakai | ........................ | H02P 1/16 318/801 |
| 6,784,634 B2 * | 8/2004 | Sweo | ...................... | H02P 21/34 322/29 |
| 7,751,211 B2 * | 7/2010 | Yuzurihara | ........... | H02M 7/125 363/127 |
| 8,693,220 B2 * | 4/2014 | Klodowski | ............. | H02P 21/06 363/37 |
| 9,013,137 B2 * | 4/2015 | Aoki | ....................... | H02P 21/26 318/807 |
| 9,923,456 B2 * | 3/2018 | Yoshinaga | ............ | H02M 5/297 |
| 10,348,231 B2 * | 7/2019 | Tachibana | ............... | H02P 21/22 |
| 2003/0090231 A1 * | 5/2003 | Yoshimoto | .............. | H02P 21/22 318/635 |
| 2008/0290826 A1 * | 11/2008 | Nagase | .................... | H02P 21/04 318/400.09 |
| 2010/0054004 A1 * | 3/2010 | Royak | ................... | H02M 7/219 363/125 |
| 2011/0134669 A1 * | 6/2011 | Yuzurihara | ........... | H02M 7/219 363/89 |
| 2013/0058144 A1 * | 3/2013 | Hiramatsu | .............. | H02M 7/48 363/131 |
| 2013/0107586 A1 * | 5/2013 | Klodowski | ............. | H02P 21/50 363/34 |
| 2013/0207622 A1 * | 8/2013 | Yuan | ......................... | G05F 1/70 323/207 |
| 2013/0279213 A1 * | 10/2013 | Saeki | ................... | H02M 5/4585 363/125 |
| 2014/0091740 A1 * | 4/2014 | Suzuki | .................... | H02P 21/22 318/400.37 |
| 2015/0123581 A1 * | 5/2015 | Omata | .................. | H02P 29/032 318/400.17 |
| 2015/0326162 A1 * | 11/2015 | Yoo | ....................... | H02P 21/141 318/801 |
| 2016/0006338 A1 * | 1/2016 | Sakimoto | ................ | H02P 9/105 363/131 |
| 2016/0061635 A1 * | 3/2016 | Liu | ........................ | G01D 5/243 702/151 |
| 2016/0079900 A1 * | 3/2016 | Ogi | ......................... | H02P 21/22 318/400.02 |
| 2017/0040922 A1 * | 2/2017 | Fujishima | ............... | H02P 21/13 |
| 2017/0237376 A1 * | 8/2017 | Saeki | .................... | H02P 27/047 318/799 |
| 2017/0288588 A1 * | 10/2017 | Tachibana | ............... | H02P 21/05 |
| 2020/0395758 A1 * | 12/2020 | Tanaka | ...................... | H02J 3/38 |
| 2021/0028735 A1 * | 1/2021 | Araki | ...................... | H02P 27/08 |
| 2021/0249966 A1 * | 8/2021 | Tobayashi | ............. | H02M 7/483 |
| 2022/0069752 A1 * | 3/2022 | Tseng | ...................... | H02P 21/18 |
| 2022/0224266 A1 * | 7/2022 | Mori | ......................... | H02P 6/10 |
| 2022/0416648 A1 * | 12/2022 | Fukasawa | ........... | H02M 1/0012 |

OTHER PUBLICATIONS

"Technical requirements for the connection and operation of customer installations to the high voltage network (TCR high voltage)—English translation of VDE-AR-N 4120:2018-11", Nov. 2018, VDE Verband der Elektrotechnik Elektronik Informationstechnik e. V., 215 pages.

* cited by examiner

CONTROL DEVICE FOR POWER CONVERSION DEVICE

FIELD

The present disclosure relates to a control device for a power conversion device.

BACKGROUND

Non Patent Literature (NPL) 1 discloses a power conversion system. In the power conversion system, a direct current (DC) power supply and a system are connected through a power conversion device.

CITATION LIST

Non Patent Literature

[NPL 1] "Technical requirements for the connection and operation of customer installations to the high voltage network (TCR high voltage)-English translation of VDE-AR-N 4120: 2018-11", November 2018, VDE Verband der Elektrotechnik Elektronik Informationstechnik e.V.

SUMMARY

Technical Problem

In the power conversion system described in NPL 1, an unbalanced short circuit may occur. In this case, it is necessary to compensate for the voltage of the system.

The present disclosure has been made in order to solve the problem described above. An object of the present disclosure is to provide a control device for a power conversion device capable of properly compensating for the voltage of a system when an unbalanced short circuit occurs.

Solution to Problem

A control device for a power conversion device according to the present disclosure includes: a first conversion unit configured to convert a detected value of alternating current (AC)-side current in a power converter that converts DC power into AC power into a normal phase d-axis current value and a reversed phase d-axis current value; a second conversion unit configured to convert a detected value of AC-side voltage in the power converter into a normal phase d-axis voltage value and a reversed phase d-axis voltage value; a current command value generator configured to generate a provisional normal phase d-axis current command value, a provisional normal phase q-axis current command value, a provisional reversed phase d-axis current command value, and a provisional reversed phase q-axis current command value on the basis of a detected value of DC-side voltage and a detected value of DC-side current of the power converter, the normal phase d-axis current value and the reversed phase d-axis current value from the first conversion unit, and the normal phase d-axis voltage value and the reversed phase d-axis voltage value from the second conversion unit, so as to compensate for the AC-side voltage of the power converter; and a limiter configured to respectively set limit values of a provisional normal phase d-axis current command value, a provisional normal phase q-axis current command value, a provisional reversed phase d-axis current command value, and a provisional reversed phase q-axis current command value that are generated by the current command value generator so that the AC-side current value of the power converter does not exceed a preset value; and a controller configured to control the power converter within the limit values set by the limiter on the basis of a determined normal phase d-axis current command value, a determined normal phase q-axis current command value, a determined reversed phase d-axis current command value, and a determined reversed phase q-axis current command value that are obtained from the provisional normal phase d-axis current command value, the provisional normal phase q-axis current command value, the provisional reversed phase d-axis current command value, and the provisional reversed phase q-axis current command value, respectively.

Advantageous Effects of Invention

According to the present disclosure, the voltage of the system can be properly compensated for when an unbalanced short circuit occurs.

DESCRIPTION OF EMBODIMENTS

Figure 1:
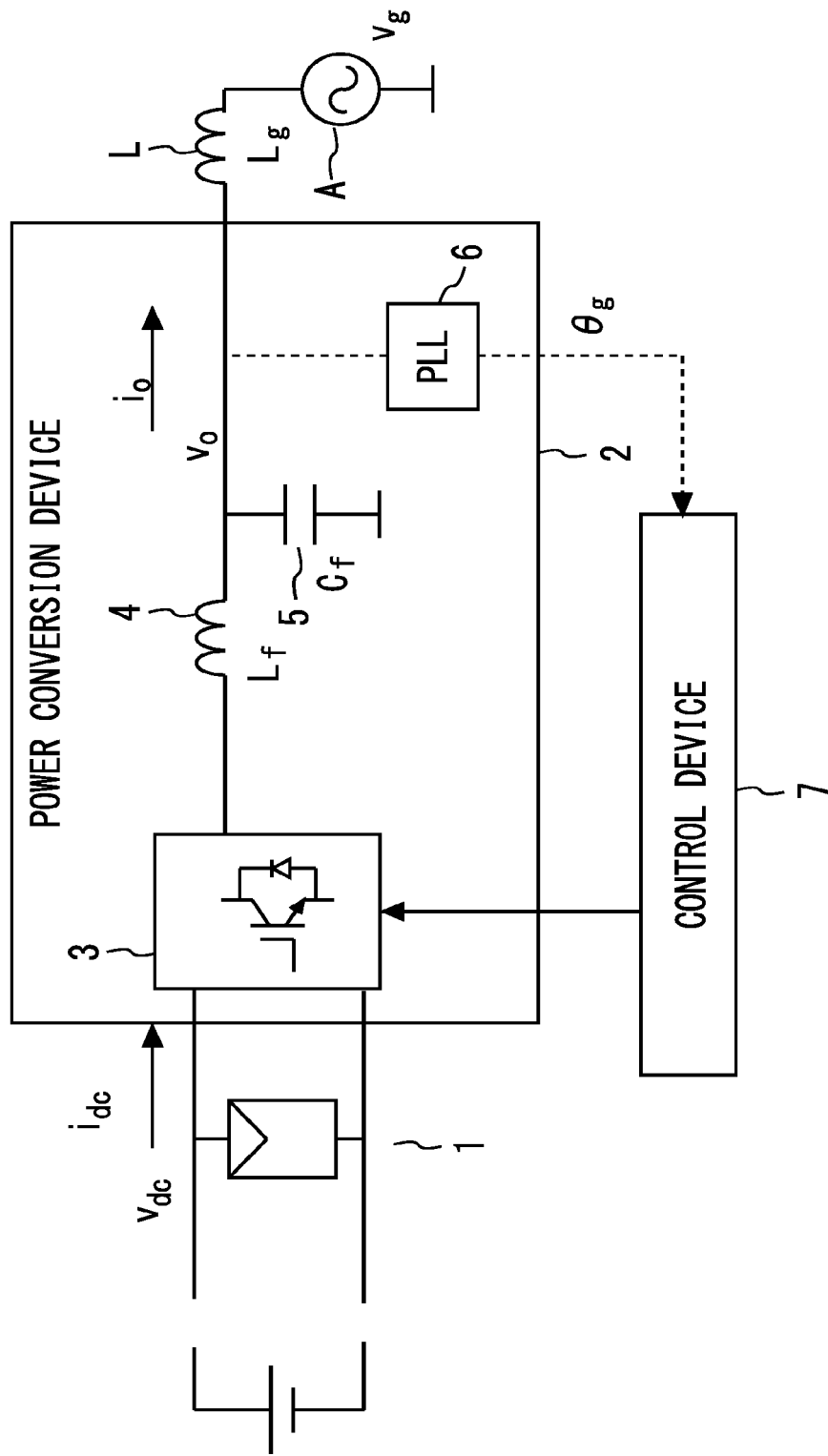
FIG. 1 is a configuration diagram of a power conversion system to which a control device for a power conversion device in a first embodiment is applied.

Embodiments will be described in accordance with the accompanying drawings. In the drawings, the same or corresponding parts are denoted by the same reference numerals. The repetitive descriptions of the parts will be simplified or omitted as appropriate.

First Embodiment

FIG. 1 is a configuration diagram of a power conversion system to which a control device for a power conversion device in a first embodiment is applied.

In the power conversion system of FIG. 1, a DC power supply 1 outputs DC power having a magnitude obtained from a DC voltage value $v_{dc}$ and a DC current value $i_{dc}$. For example, the DC power supply 1 is a solar photovoltaic device. For example, the DC power supply 1 is a storage device. A power conversion device 2 converts DC power from the DC power supply 1 into AC power.

The power conversion device 2 includes a power converter 3, a filter reactor 4, a filter capacitor 5, a phase-locked loop (PLL) circuit 6, and a control device 7.

The power converter 3 includes a plurality of semiconductor switching elements such as insulated-gate bipolar transistors (IGBTs) or metal-oxide-semiconductor field-effect transistors (MOSFETs). The power converter 3 converts DC power into three-phase AC power in accordance with switching control information. The power converter 3 outputs three-phase AC power obtained from an AC current value $i_o$ and an AC voltage value $v_o$.

One end of the filter reactor 4 is connected to the output end of the power converter 3. The filter reactor 4 has inductance Lf. One end of the filter capacitor 5 is connected to the other end of the filter reactor 4. The other end of the filter capacitor 5 is connected to a reference potential such as a ground potential. The filter capacitor 5 has a capacitance $C_f$.

The PLL circuit 6 outputs information on a phase $\theta_g$. The information on the phase $\theta_g$ is information for detecting a phase error with reference frequency information to perform phase synchronization.

The control device 7 outputs switching control information on the basis of the AC current value $i_o$, the AC voltage value $v_o$, and the phase $\theta_g$. The switching control information is gate drive information for driving each semiconductor switching element of the power converter 3.

One end of the interconnection reactor L is connected to a connection point between the filter reactor 4 and the filter capacitor 5. The other end of the interconnection reactor L is connected to an AC power system A as an AC power supply. The interconnection reactor L has inductance $L_g$.

In the embodiment, an unbalanced short circuit may occur on the AC side of the power converter 3. For example, a two-phase short circuit may occur in three phases of UVW. For example, a short circuit may occur in which any one of the three phases of UVW is grounded.

At this time, the control device 7 controls the power converter 3 so that a three-phase AC current value io does not exceed a preset value while compensating for the AC-side voltage of the power converter 3.

Next, the outline of the operation of the control device 7 will be described with reference to FIG. 2.

Figure 2:
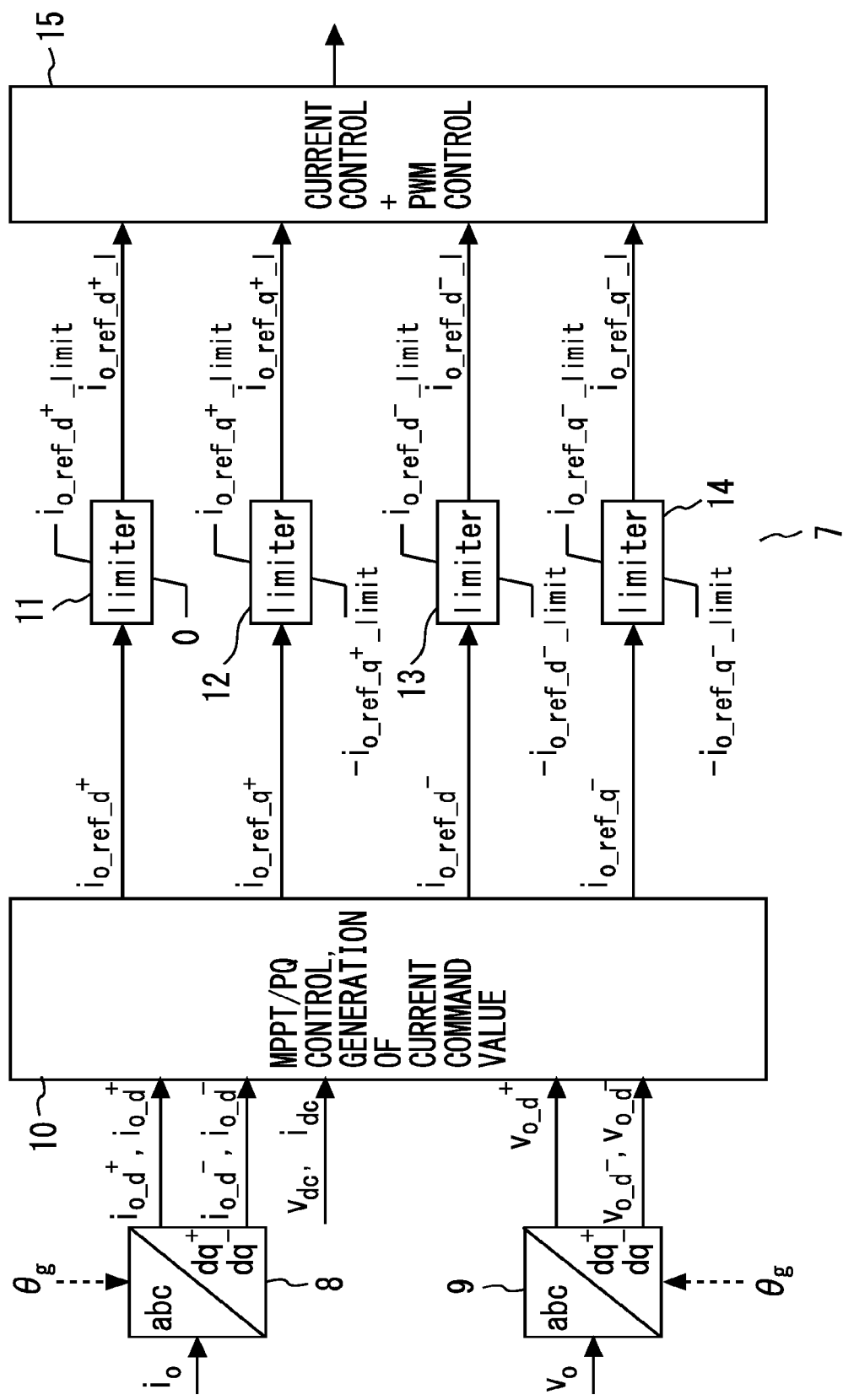
FIG. 2 is a block diagram for explaining the outline of the operation of the control device for the power conversion device according to the first embodiment.

FIG. 2 is a block diagram for explaining the outline of the operation of the control device for the power conversion device according to the first embodiment.

As shown in FIG. 2, the control device 7 includes a first conversion unit 8, a second conversion unit 9, a current command value generator 10, a first limiter 11, a second limiter 12, a third limiter 13, a fourth limiter 14, and a controller 15.

The first conversion unit 8 receives the input of the information on the AC current value $i_o$ from a detector (not shown). The first conversion unit 8 receives the input of the information on the phase $\theta_g$. The first conversion unit 8 outputs information on a normal phase d-axis current value $i_{o\_d+}$ and a reversed phase d-axis current value $i_{o\_d-}$ based on the AC current value $i_o$ and the phase $\theta_g$.

The second conversion unit 9 receives the input of the information on the AC voltage value $v_o$ (not shown). The first conversion unit 8 receives the input of the information on the phase $\theta_g$. The second conversion unit 9 outputs information on a normal phase d-axis voltage value $v_{o\_d+}$ and a reversed phase d-axis voltage value $v_{o\_d-}$ based on the AC voltage value $v_o$ and the phase $\theta_g$.

The current command value generator 10 receives the input of the information on the normal phase d-axis current value $i_{o\_d+}$ and the reversed phase d-axis current value $i_{o\_d-}$ from the first conversion unit 8. The current command value generator 10 receives the input of the information on the normal phase d-axis voltage value $v_{o\_d+}$ and the reversed phase d-axis voltage value $v_{o\_d-}$ from the second conversion unit 9. The current command value generator 10 receives the input of the information on the DC voltage value $v_{dc}$ (not shown). The current command value generator 10 receives the input of the information on the DC current value $i_{dc}$ (not shown). The current command value generator 10 outputs information on a provisional normal phase d-axis current command value $i_{o\_ref\_d+}$, a provisional normal phase q-axis current command value $i_{o\_ref\_q+}$, a provisional reversed phase d-axis current command value $i_{o\_ref\_d-}$, and a provisional reversed phase q-axis current command value $i_{o\_ref\_q-}$ for maximum power point tracking (MPPT) control or PQ control based on the normal phase d-axis current value $i_{o\_d+}$, the reversed phase d-axis current value $i_{o\_d-}$, the normal phase d-axis voltage value $v_{o\_d+}$, the reversed phase d-axis voltage value $v_{o\_d-}$, the DC voltage value $v_{dc}$, and the DC current value $i_{dc}$.

The first limiter 11 receives input of information on 0 as a lower limit value. The first limiter 11 receives input of information on a limit value $i_{o\_ref\_d+\_limit}$ as an upper limit value. The first limiter 11 receives the input of the information on the provisional normal phase d-axis current command value $i_{o\_ref\_d+}$ from the current command value generator 10. When the provisional normal phase d-axis current command value $i_{o\_ref\_d+}$ is a value between 0 and the limit value $i_{o\_ref\_d+\_limit}$ the first limiter 11 outputs the information on the provisional normal phase d-axis current command value $i_{o\_ref\_d+}$ as it is as a determined normal phase d-axis current command value $i_{o\_ref\_d+I}$. When $i_{o\_ref\_d+}$ is 0 or less, the first limiter 11 outputs the information on 0 as the determined normal phase d-axis current command value $i_{o\_ref\_d+I}$. When the provisional normal phase d-axis current command value $i_{o\_ref\_d+}$ is equal to or larger than the limit value $i_{o\_ref\_d+\_limit}$, the first limiter 11 outputs the information on the limit value $i_{o\_ref\_d+\_limit}$ as the determined normal phase d-axis current command value $i_{o\_ref\_d+I}$.

The second limiter 12 receives input of information on a limit value $-i_{o\_ref\_q+\_limit}$ as a lower limit value. The second limiter 12 receives input of information on a limit value $i_{o\_ref\_q+\_limit}$ as an upper limit value. The second limiter 12 receives the input of the information on the provisional normal phase q-axis current command value $i_{o\_ref\_q+}$ from the current command value generator 10. When the provisional normal phase q-axis current command value $i_{o\_ref\_q+}$ is a value between the limit value $-i_{o\_ref\_q+\_limit}$ and the limit value $i_{o\_ref\_q+\_limit}$ the second limiter 12 outputs the information on the provisional normal phase q-axis current command value $i_{o\_ref\_q+}$ as it is as a determined normal phase q-axis current command value $i_{o\_ref\_q+I}$. When the provisional normal phase q-axis current command value $i_{o\_ref\_q+}$ is equal to or less than the limit value $-i_{o\_ref\_q+\_limit}$ the second limiter 12 outputs the information on the limit value $-i_{o\_ref\_q+\_limit}$ as the determined normal phase q-axis current command value $i_{o\_ref\_q+I}$. When the provisional normal phase q-axis current command value $i_{o\_ref\_q+}$ is equal to or larger than the limit value $i_{o\_ref\_q+\_limit}$, the second limiter 12 outputs the information on the limit value $i_{o\_ref\_q+\_limit}$ as the provisional normal phase q-axis current command value $i_{o\_ref\_q+I}$.

The third limiter 13 receives input of information on a limit value $-i_{o\_ref\_d-\_limit}$ as a lower limit value. The third limiter 13 receives input of information on a limit value $i_{o\_ref\_d-\_limit}$ as an upper limit value. The third limiter 13 receives the input of the information on the provisional reversed phase d-axis current command value $i_{o\_ref\_d-}$ from the current command value generator 10. When the provisional reversed phase d-axis current command value $i_{o\_ref\_d-}$ a value between the limit value $-i_{o\_ref\_d-\_limit}$ and the limit value $i_{o\_ref\_d-\_limit}$ the third limiter 13 outputs the information on the provisional reversed phase d-axis current command value $i_{o\_ref\_d-}$ as it is as a determined reversed phase d-axis current command value $i_{o\_ref\_d-I}$. When the provisional reversed phase d-axis current command value $i_{o\_ref\_d-}$ equal to or less than the limit value $-i_{o\_ref\_d-\_limit}$, the third limiter outputs the information on the limit value $-i_{o\_ref\_d-\_limit}$ as the provisional reversed phase d-axis current command value $i_{o\_ref\_d-I}$. When the provisional reversed phase d-axis current command value $i_{o\_ref\_d-}$ is equal to or larger than the limit value $i_{o\_ref\_d-\_limit}$, the third limiter 13 outputs the information on the limit value $i_{o\_ref\_d-\_limit}$ as the provisional reversed phase d-axis current command value $i_{o\_ref\_d-I}$.

The fourth limiter 14 receives input of information on a limit value $-i_{o\_ref\_q-\_limit}$ as a lower limit value. The fourth limiter 14 receives input of information on a limit value $i_{o\_ref\_q-\_limit}$ as an upper limit value. The fourth limiter 14 receives the input of the information on the provisional reversed phase q-axis current command value $i_{o\_ref\_q-}$ from the current command value generator 10. When the provisional reversed phase q-axis current command value $i_{o\_ref\_q-}$ is a value between the limit value $-i_{o\_ref\_q-\_limit}$ and the limit value $i_{o\_ref\_q-\_limit}$, the fourth limiter 14 outputs the information on the provisional reversed phase q-axis current command value $i_{o\_ref\_q-}$ as it is as a determined reversed phase q-axis current command value $i_{o\_ref\_q-I}$. When the provisional reversed phase q-axis current command value $i_{o\_ref\_q-}$ equal to or less than the limit value $-i_{o\_ref\_q+\_limit}$, the fourth limiter 14 outputs the information on the limit value $i_{o\_ref\_q-\_limit}$ as the determined reversed phase q-axis current command value $i_{o\_ref\_q-I}$. When the provisional reversed phase q-axis current command value $i_{o\_ref\_q+}$ is equal to or larger than the limit value $i_{o\_ref\_q-\_limit}$ the fourth limiter 14 outputs the information on the limit value $i_{o\_ref\_q-\_limit}$ as the determined reversed phase q-axis current command value $i_{o\_ref\_q-I}$.

The controller 15 receives the input of the information on the determined normal phase d-axis current command value $i_{o\_ref\_d+I}$ from the first limiter 11. The controller 15 receives the input of the information on the determined normal phase q-axis current command value $i_{o\_ref\_q+I}$ from the second limiter 12. The controller 15 receives the input of the information on the determined reversed phase d-axis current command value $i_{o\_ref\_d-I}$ from the third limiter 13. The controller 15 receives the input of the information on the determined reversed phase q-axis current command value $i_{o\_ref\_q-I}$ from a fourth limiter 14. The controller 15 outputs switching control information for current control and PWM control on the basis of the determined normal phase d-axis current command value $i_{o\_ref\_d+I}$, the determined normal phase q-axis current command value $i_{o\_ref\_q+I}$, the determined reversed phase d-axis current command value $i_{o\_ref\_d-I}$, and the determined reversed phase q-axis current command value $i_{o\_ref\_q-I}$.

Next, with reference to FIG. 3, a method of generating the limit value $i_{o\_ref\_q+\_limit}$ and the limit value $i_{o\_ref\_q+\_limit}$ will be described.

Figure 3:
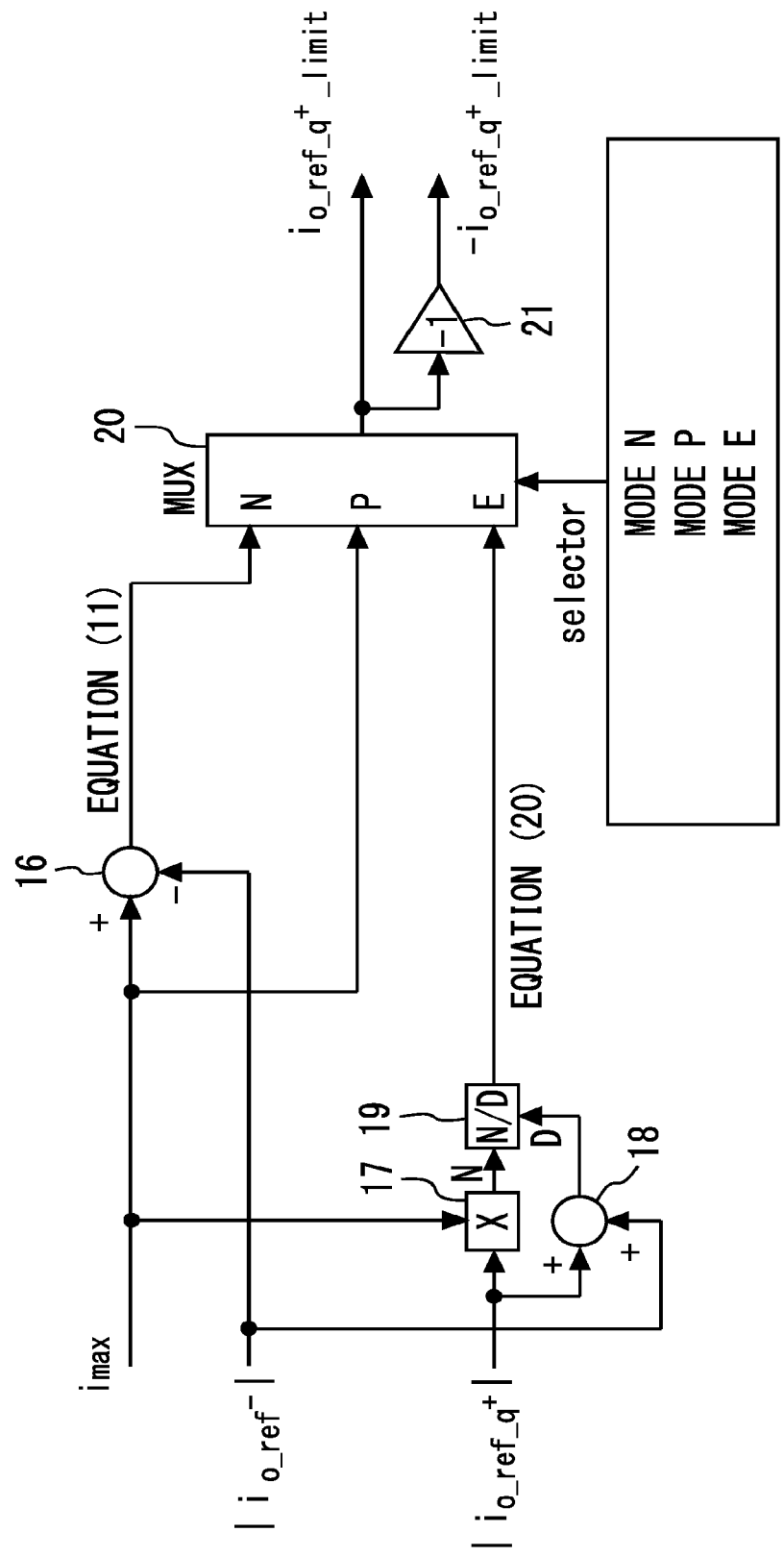
FIG. 3 is a block diagram for explaining a method of generating a limit value for a provisional normal phase q-axis current command value by the control device for the power conversion device according to the first embodiment.

FIG. 3 is a block diagram for explaining the method of generating the limit value for the provisional normal phase q-axis current command value by the control device for the power conversion device according to the first embodiment.

As shown in FIG. 3, the control device 7 includes a first subtractor 16, a first multiplier 17, a first adder 18, a first divider 19, a first selector 20, and a first inverter 21.

The first subtractor 16 receives input of information on a rated current value $i_{max}$ as a preset threshold. The first subtractor 16 receives input of information on an absolute value of a provisional reversed phase current command value $i_{o\_ref-}$ obtained from the provisional reversed phase d-axis current command value $i_{o\_ref\_d-}$ and the provisional reversed phase q-axis current command value $i_{o\_ref\_q-}$. The first subtractor 16 outputs information on a value obtained by subtracting the absolute value of the provisional reversed phase current command value $i_{o\_ref-}$ from the rated current value $i_{max}$.

The first multiplier 17 receives the input of the information on the rated current value $i_{max}$. The first multiplier 17 receives the input of the information on the absolute value of the provisional normal phase q-axis current command value $i_{o\_ref\_q+}$. The first multiplier 17 outputs information on a value obtained by multiplying the rated current value $i_{max}$ by the absolute value of the provisional normal phase q-axis current command value $i_{o\_ref\_q+}$.

The first adder 18 receives the input of the information on the absolute value of the provisional reversed phase current command value $i_{o\_ref-}$. The first adder 18 receives the input of the information on the absolute value of a provisional normal phase q-axis current command value $i_{o\_ref\_q+}$. The first adder 18 outputs information on a value obtained by adding the absolute value of a provisional normal phase q-axis current command value $i_{o\_ref\_q+}$ to the absolute value of the provisional reversed phase current command value $i_{o\_ref-}$.

The first divider 19 receives the input of the information on the output value of the first multiplier 17. The first divider 19 receives the input of the information on the output value of the first adder 18. The first divider 19 outputs information on a value obtained by dividing the output value of the first multiplier 17 by the output value of the first adder 18.

The first selector 20 receives the input of the information on the output value of the first subtractor 16. The first selector 20 receives the input of the information on the rated current value $i_{max}$. The first selector 20 receives the input of the information on the output value of the first divider 19. The first selector 20 outputs any one of the pieces of information on the output value of the first subtractor 16, the rated current value $i_{max}$, and the output value of the first divider 19 as the limit value $i_{o\_ref\_q+\_limit}$.

For example, when the mode N in which the reversed phase current is given priority has been selected, the first selector 20 outputs the information on the output value of the first subtractor 16 as the limit value $i_{o\_ref\_q+\_limit}$. For example, when the mode P in which the normal phase current is given priority has been selected, the first selector 20 outputs the information on the rated current value $i_{max}$. For example, when the mode E in which neither the reversed phase current nor the normal phase current is given priority has been selected, the first selector 20 outputs the output value of the first divider 19.

The first inverter 21 receives the input of the information on the output value of the first selector 20. The first inverter 21 outputs information on a value obtained by inverting the sign of the output value of the first selector 20 as the limit value $-i_{o\_ref\_q+\_limit}$.

Next, with reference to FIG. 4, a method of generating the limit value $i_{o\_ref\_d-\_limit}$, the limit value $-i_{o\_ref\_d-\_limit}$, the limit value $i_{o\_ref\_q-\_limit}$, and the limit value $-i_{o\_ref\_q-\_limit}$ will be described.

Figure 4:
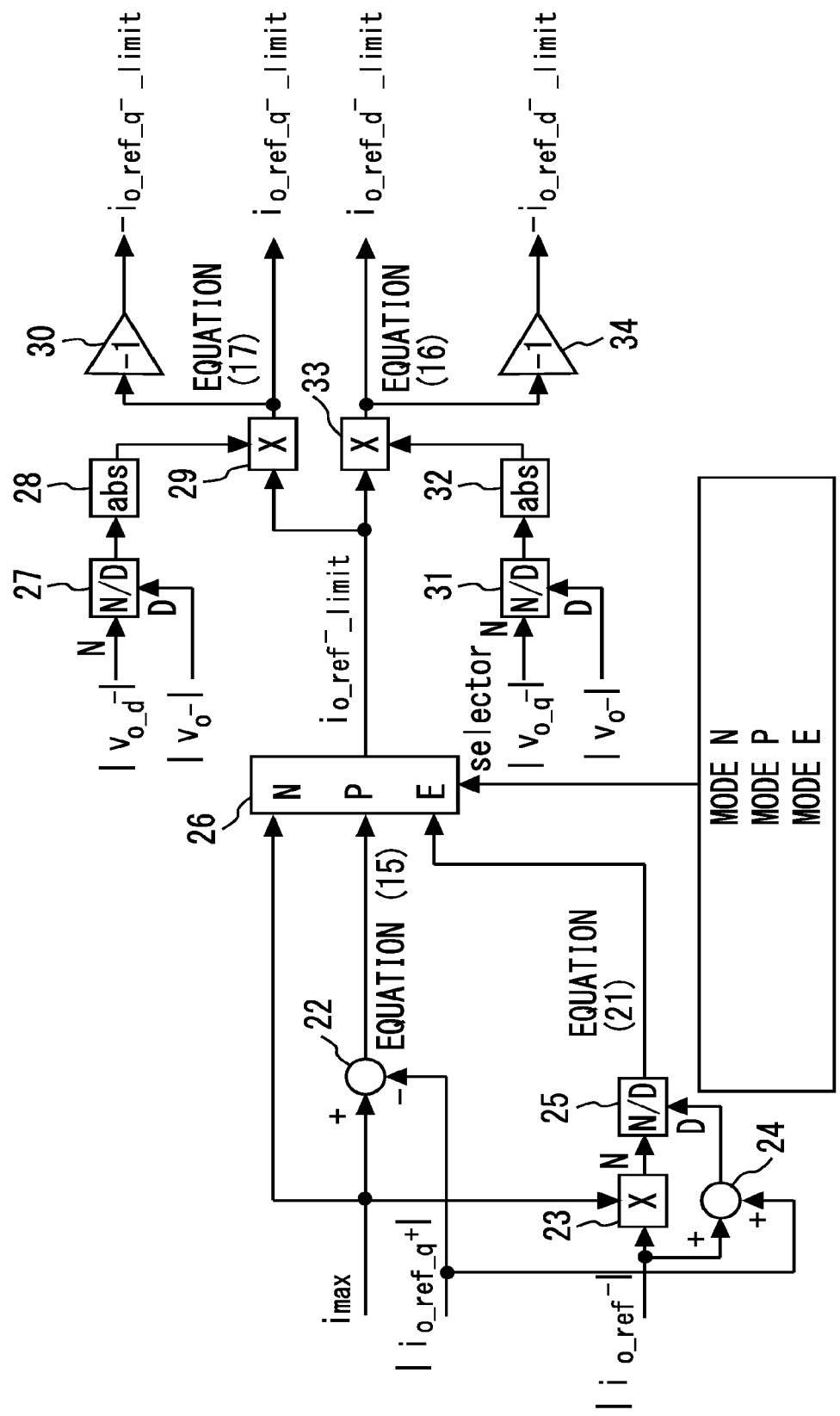
FIG. 4 is a block diagram for explaining a method of generating limit values for a provisional reversed phase d-axis current command value and limit values for a provisional reversed phase q-axis current command value by the control device for the power conversion device according to the first embodiment.

FIG. 4 is a block diagram for explaining the method of generating the limit values for the provisional reversed phase d-axis current command value and the limit values for the provisional reversed phase q-axis current command value by the control device for the power conversion device according to the first embodiment.

As shown in FIG. 4, the control device 7 includes a second subtractor 22, a second multiplier 23, a second adder 24, a second divider 25, a second selector 26, a third divider 27, a first absolute value calculator 28, a third multiplier 29, a second inverter 30, a fourth divider 31, a second absolute value calculator 32, a fourth multiplier 33, and a third inverter 34.

The second subtractor 22 receives the input of the information on the rated current value $i_{max}$. The second subtractor 22 receives the input of the information on the absolute value of a provisional normal phase q-axis current command value $i_{o\_ref\_q+}$. The first subtractor 16 outputs information on a value obtained by subtracting the absolute value of the provisional normal phase q-axis current command value $i_{o\_ref\_q+}$ from the rated current value $i_{max}$.

The second multiplier 23 receives the input of the information on the rated current value $i_{max}$. The second multiplier 23 receives the input of the information on the absolute value of the provisional reversed phase current command value $i_{o\_ref-}$. The first multiplier 17 outputs information on a value obtained by multiplying the rated current value $i_{max}$ by the absolute value of a provisional reversed phase current command value $i_{o\_ref-}$.

The second adder 24 receives the input of the information on the absolute value of the provisional reversed phase current command value $i_{o\_ref-}$. The second adder 24 receives the input of the information on the absolute value of a provisional normal phase q-axis current command value $i_{o\_ref\_q+}$. The first adder 18 outputs information on a value obtained by adding the absolute value of the provisional reversed phase current command value $i_{o\_ref\_q+}$ to the absolute value of the provisional reversed phase current command value $i_{o\_ref-}$.

The second divider 25 receives the input of the information on the output value of the second multiplier 23. The second divider 25 receives the input of the information on the output value of the second adder 24. The second divider 25 outputs information on a value obtained by dividing the output value of the second multiplier 23 by the output value of the second adder 24.

The second selector 26 receives the input of the information on the rated current value $i_{max}$. The second selector 26 receives the input of the information on the output value of the second subtractor 22. The second selector 26 receives the input of the information on the output value of the second divider 25. The second selector 26 outputs any one of the pieces of information on the rated current value $i_{max}$, the output value of the second subtractor 22, and the output value of the second divider 25 as a limit value $i_{o\_ref-\_limit}$.

For example, when the mode N in which the reversed phase current is given priority has been selected, the second selector 26 outputs the information on the rated current value $i_{max}$ as the limit value $i_{o\_ref-\_limit}$. For example, when the mode P in which the normal phase current is given priority has been selected, the second selector 26 outputs the output value of the second subtractor 22. For example, when the mode E in which neither the reversed phase current nor the normal phase current is given priority has been selected, the second selector 26 outputs the output value of the second divider 25.

The third divider 27 receives the input of the information on the absolute value of the reversed phase d-axis voltage value $v_{o\_d-}$. The third divider 27 receives input of information on an absolute value of a reversed phase voltage value $v_{o-}$ obtained from the reversed phase d-axis voltage value $v_{o\_d-}$ and a reversed phase q-axis voltage value $v_{o\_q-}$O. The third divider 27 outputs information on a value obtained by dividing the absolute value of the reversed phase d-axis voltage value $v_{o\_d-}$ by the absolute value of the reversed phase voltage value $v_{o-}$.

The first absolute value calculator 28 receives the input of the output value of the third divider 27. The first absolute value calculator 28 outputs the information on the absolute value of the output value of the third divider 27.

The third multiplier 29 receives the input of the information on the limit value $i_{o\_ref-\_limit}$ from the second selector 26. The third multiplier 29 receives the input of the information on the output value of the first absolute value calculator 28. The third multiplier 29 outputs information on a value obtained by multiplying the limit value $i_{o\_ref-\_limit}$ by the output value of a first absolute value calculator 28 as the limit value $i_{o\_ref-\_q-limit}$.

The second inverter 30 puts the input of the information on the output value of the third multiplier 29. The second inverter 30 outputs information on a value obtained by inverting the sign of the output value of the third multiplier 29 as the limit value $-i_{o\_ref-\_q-limit}$.

The fourth divider 31 receives the input of the information on the absolute value of the reversed phase q-axis voltage value $v_{o\_q-}$. The fourth divider 31 receives the input of the information on the absolute value of the reversed phase voltage value $v_{o-}$. The fourth divider 31 outputs information on a value obtained by dividing the absolute value of the reversed phase q-axis voltage value $v_{o\_q-}$ by the absolute value of the reversed phase voltage value $v_{o-}$.

The second absolute value calculator 32 receives the input of the output value of the fourth divider 31. The second absolute value calculator 32 outputs the information on the absolute value of the output value of the fourth divider 31.

The fourth multiplier 33 receives the input of the information on the limit value $i_{o\_ref-\_limit}$ from the second selector 26. The fourth multiplier 33 receives the input of the information on the output value of the second absolute value calculator 32. The fourth multiplier 33 outputs information on a value obtained by multiplying the limit value $i_{o\_ref-\_limit}$ limit by the output value of a second absolute value calculator 32 as the limit value $i_{o\_ref-\_d-limit}$.

The third inverter 34 puts the input the information on the output value of the fourth multiplier 33. The third inverter 34 outputs information on a value obtained by inverting the sign of the output value of the fourth multiplier 33 as the limit value $-i_{o\_ref-\_d-limit}$.

Next, a method of generating the limit value $-i_{o\_ref-\_d+\_limit}$ will be described with reference to FIG. 5.

Figure 5:
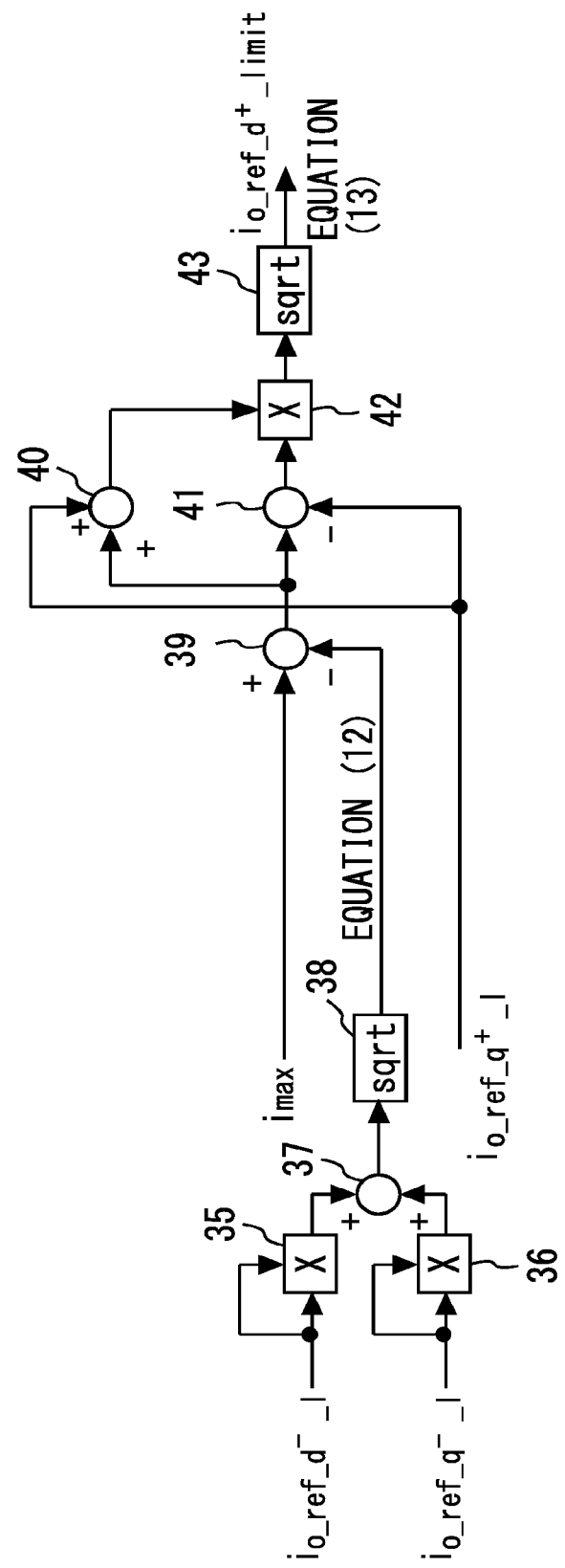
FIG. 5 is a block diagram for explaining a method of generating a limit value for a provisional normal phase d-axis current command value by the control device for the power conversion device according to the first embodiment.

FIG. 5 is a block diagram for explaining the method of generating the limit value for the provisional normal phase d-axis current command value by the control device for the power conversion device according to the first embodiment.

As shown in FIG. 5, the control device 7 includes a fifth multiplier 35, a sixth multiplier 36, a third adder 37, a first square root calculator 38, a third subtractor 39, a fourth adder 40, a fourth subtractor 41, a fourth subtractor 42, and a second square root calculator 43.

The fifth multiplier 35 receives the input of the information on the determined reversed phase d-axis current command value $i_{o\_ref\_d-\_I}$. The fifth multiplier 35 outputs information on a value obtained by squaring the determined reversed phase d-axis current command value $i_{o\_ref\_d-\_I}$.

The sixth multiplier 36 receives the input of the information on the determined reversed phase q-axis current command value $i_{o\_ref\_q-\_I}$. The sixth multiplier 36 outputs information on a value obtained by squaring the determined reversed phase q-axis current command value $i_{o\_ref\_q-\_I}$.

The third adder 37 puts the input of the information on the output value of the fifth multiplier 35. The third adder 37 puts the input of the information on the output value of the sixth multiplier 36. The third adder 37 outputs information on a value obtained by adding the output value of the fifth multiplier 35 to the output value of the sixth multiplier 36.

The first square root calculator 38 receives the input of the information on the output value of a third adder. The first square root calculator 38 outputs information on a square root value of the output value of the third adder.

The third subtractor 39 receives the input of the information on the rated current value $i_{max}$. The third subtractor 39 receives the input of the information on the output value of the first square root calculator 38. The third subtractor 39 outputs information on a value obtained by subtracting the output value of the first square root calculator 38 from the rated current value $i_{max}$.

The fourth adder 40 puts the input of the information on the output value of the third subtractor 39. The fourth adder 40 receives the input of the information on the determined normal phase q-axis current command value $i_{o\_ref\_q+\_I}$. The fourth adder 40 outputs information on a value obtained by adding the determined normal phase q-axis current command value $i_{o\_ref\_q+\_I}$ to the output value of a third subtractor 39.

The fourth subtractor 41 puts the input of the information on the output value of the third subtractor 39. The fourth subtractor 41 receives the input of the information on the determined normal phase q-axis current command value $i_{o\_ref\_q+\_I}$. The fourth subtractor 41 outputs information on a value obtained by subtracting the determined normal phase q-axis current command value $i_{o\_ref\_q+\_I}$ from the output value of a third subtractor 39.

The fourth subtractor 42 receives the input of the information on the output value of the fourth adder 40. The fourth subtractor 42 receives the input of the information on the output value of the fourth subtractor 41. The fourth subtractor 42 outputs information on a value obtained by multiplying the output value of the fourth adder 40 by the output value of the fourth subtractor 41.

The second square root calculator 43 receives the input of the information on the output value of the fourth subtractor 42. The second square root calculator 43 outputs information on a square root value of the output value of the fourth subtractor 42 as the limit value $i_{o\_ref\_d+\_limit}$.

Next, the relationship between the provisional normal phase current command value $i_{o\_ref+}$ and the provisional reversed phase current command value $i_{o\_ref-}$ will be described with reference to FIG. 6.

Figure 6:
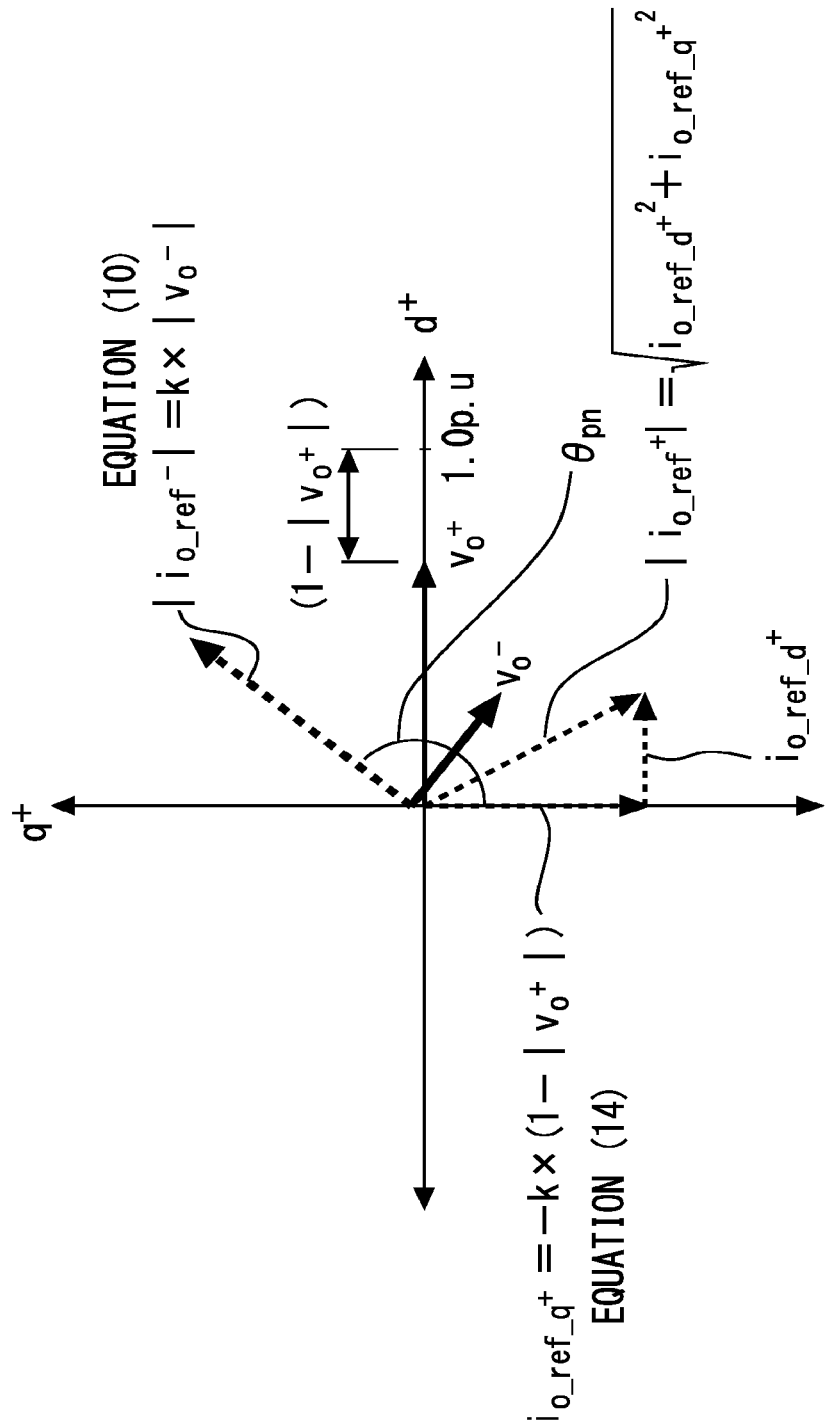
FIG. 6 is a diagram for explaining the relationship between a provisional normal phase current command value and a provisional reversed phase current command value by the control device for the power conversion device according to the first embodiment.

FIG. 6 is a diagram for explaining the relationship between the provisional normal phase current command value and the provisional reversed phase current command value by the control device for the power conversion device according to the first embodiment.

On the AC side of the power converter 3, a maximum value $I_u$ of U-phase current is expressed by Equation (1) below:

A maximum value $I_v$ of V-phase current is expressed by Equation (2) below. The maximum value $I_w$ of the W-phase current is expressed by Equation (3) below:

[Math. 1]
$$I_u = \sqrt{|i_{o\_ref+}|^2 + |i_{o\_ref-}|^2 + 2 \times |i_{o\_ref+}| \times |i_{o\_ref-}| \times \cos\theta_{pn}} \quad (1)$$

[Math. 2]
$$I_v = \sqrt{|i_{o\_ref+}|^2 + |i_{o\_ref-}|^2 + 2 \times |i_{o\_ref+}| \times |i_{o\_ref-}| \times \cos\left(\theta_{pn} - \frac{2\pi}{3}\right)} \quad (2)$$

[Math. 3]
$$I_w = \sqrt{|i_{o\_ref+}|^2 + |i_{o\_ref-}|^2 + 2 \times |i_{o\_ref+}| \times |i_{o\_ref-}| \times \cos\left(\theta_{pn} + \frac{2\pi}{3}\right)} \quad (3)$$

In the equations (1) to (3), $\theta_{pn}$ is the phase difference between the normal phase current and the reversed phase current.

When the phase difference $\theta_{pn}$ is any one of 0, $+2\pi/3$, and $-2\pi/3$ in the maximum value $I_u$ of the U-phase current, the maximum value $I_v$ of the V-phase current, and the maximum value $I_w$ of the W-phase current, a maximum value MAX$\{I_u, I_v, I_w\}$ is obtained. The maximum value MAX $\{I_u, I_v, I_w\}$ is expressed by Equation (4) below:

[Math. 4]

$$\text{MAX}\{I_u, I_v, I_w\} = \sqrt{|i_{o\_ref+}|^2 + |i_{o\_ref-}|^2 + 2 \times |i_{o\_ref+}| \times |i_{o\_ref-}| \times 1} \quad (4)$$

$$= |i_{o\_ref+}| + |i_{o\_ref-}|$$

The control device 7 controls the power converter 3 so that Equation (5) below holds:

[Math. 5]

$$\text{MAX}\{I_u, I_v, I_w\} \leq i_{max} \quad (5)$$

Specifically, the control device 7 controls the power converter 3 so that Equation (6) below holds:

[Math. 6]

$$|i_{o_{ref}+}| + |i_{o\_ref-}| \leq \text{MAX}\{I_u, I_v, I_w\} \quad (6)$$

More specifically, the control device 7 controls the power converter 3 so that Equation (7) below holds:

[Math. 7]

$$|i_{o_{ref}+}| + |i_{o\_ref-}| \leq i_{max} \quad (7)$$

Next, examples of the mode N in which the reversed phase current is given priority will be described with reference to FIGS. 7 and 8.

Figure 7:
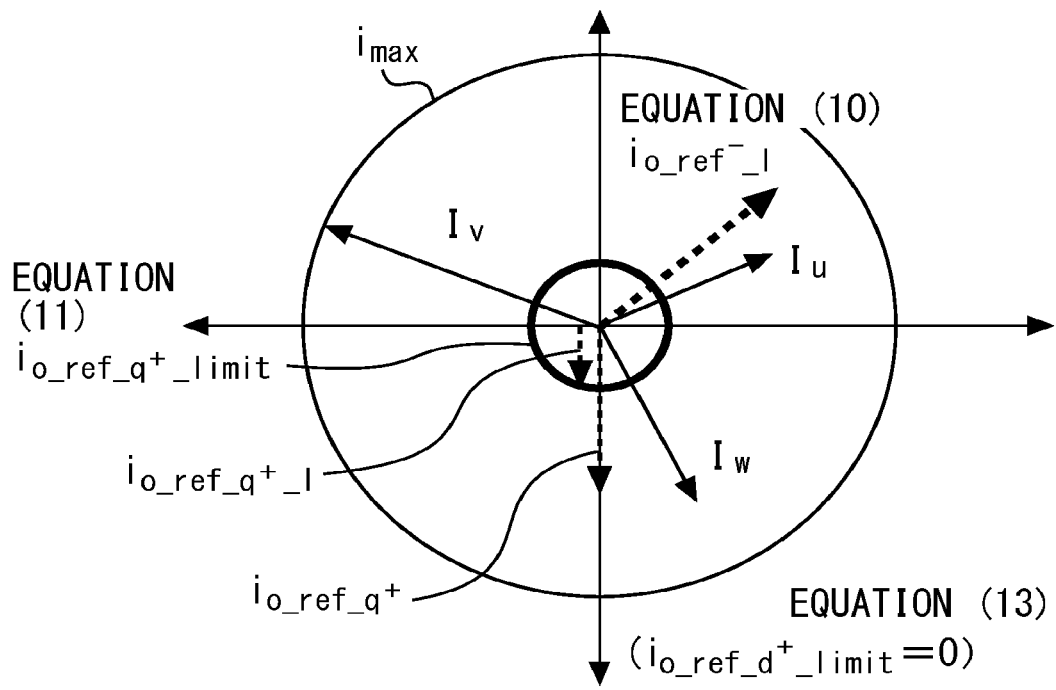
FIG. 7 is a diagram for explaining a first example of a mode N in which the reversed phase current is given priority by the control device for the power conversion device according to the first embodiment.

FIG. 7 is a diagram for explaining a first example of the mode N in which the reversed phase current is given priority by the control device for the power conversion device according to the first embodiment. FIG. 8 is a diagram for explaining a second example of the mode N in which the reversed phase current is given priority by the control device for the power conversion device according to the first embodiment.

The provisional reversed phase d-axis current command value $i_{o\_ref\_d-}$ is expressed by Equation (8) below:

[Math. 8]

$$i_{o\_ref\_d-} = -k \times v_{o\_q-} \quad (8)$$

The provisional reversed phase q-axis current command value $i_{o\_ref\_q-}$ is expressed by Equation (9) below:

[Math. 9]

$$i_{o\_ref\_q-} = +k \times v_{o\_d-} \quad (9)$$

The absolute value of the provisional reversed phase current command value $i_{o\_ref-}$ is expressed by Equation (10) below:

[Math. 10]

$$|i_{o\_ref-}| = k \times |v_{o-}| \quad (10)$$

The limit value $i_{o\_ref\_q+\_limit}$ is expressed by Equation (11) below:

[Math. 11]

$$i_{o\_ref\_q+\_limit} = i_{max} - |i_{o\_ref-}| \quad (11)$$

A determined reversed phase current command value $i_{o\_ref-\_l}$ is expressed by Equation (12) below:

[Math. 12]

$$i_{o\_ref-\_l} = \sqrt{i_{o\_ref\_d-\_l}^2 + i_{o\_ref\_q-\_l}^2} \quad (12)$$

The limit value $i_{o\_ref\_d+\_limit}$ is expressed by Equation (13) below:

[Math. 13]

$$i_{o\_ref\_d+\_limit} = \sqrt{(i_{max} - |i_{o\_ref-\_l}|)^2 - |i_{o\_ref\_q+\_l}|^2} \quad (13)$$

$$= \sqrt{\frac{(i_{max} - |i_{o\_ref-\_l}| - |i_{o\_ref\_q+\_l}|)}{(i_{max} - |i_{o\_ref-\_l}| + |i_{o\_ref\_q+\_l}|)}}$$

In the first example of FIG. 7, the absolute value of the provisional normal phase q-axis current command value $i_{o\_ref\_q+}$ is larger than the absolute value of the limit value $i_{o\_ref\_q+\_limit}$. In this case, the absolute value of the determined normal phase q-axis current command value $i_{o\_ref\_q+\_l}$ is limited to the absolute value of the limit value $i_{o\_ref\_q+\_limit}$.

Figure 8:
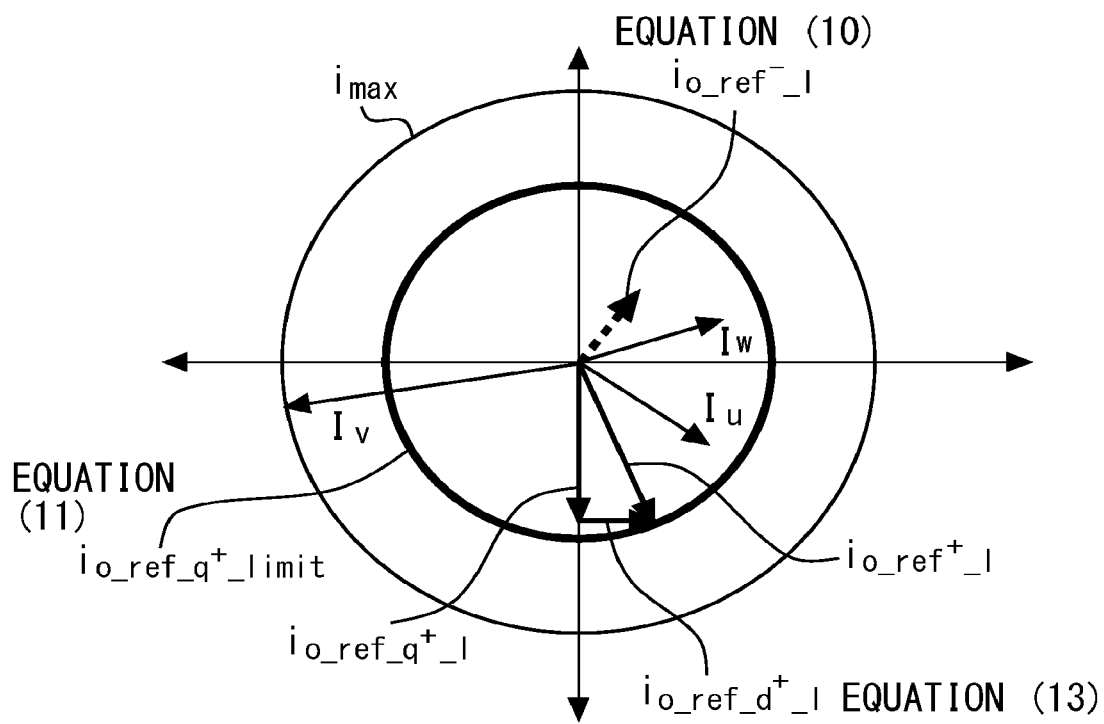
FIG. 8 is a diagram for explaining a second example of the mode N in which the reversed phase current is given priority by the control device for the power conversion device according to the first embodiment.

In the second example of FIG. 8, the absolute value of the provisional normal phase q-axis current command value $i_{o\_ref\_q+}$ is smaller than the absolute value of the limit value $i_{o\_ref\_q+\_limit}$. In this case, the determined normal phase q-axis current command value $i_{o\_ref\_q+\_l}$ is not limited to the absolute value of the limit value $i_{o\_ref\_q+\_limit}$. At this time, a determined normal phase current command value $i_{o\_ref+\_l}$ is the sum of the determined normal phase d-axis current command value $i_{o\_ref\_d+\_l}$ and the determined normal phase q-axis current command value $i_{o\_ref\_q+\_l}$.

Next, with reference to FIGS. 9 and 10, a first example of the mode P in which the normal phase current is given priority will be described.

Figure 9:
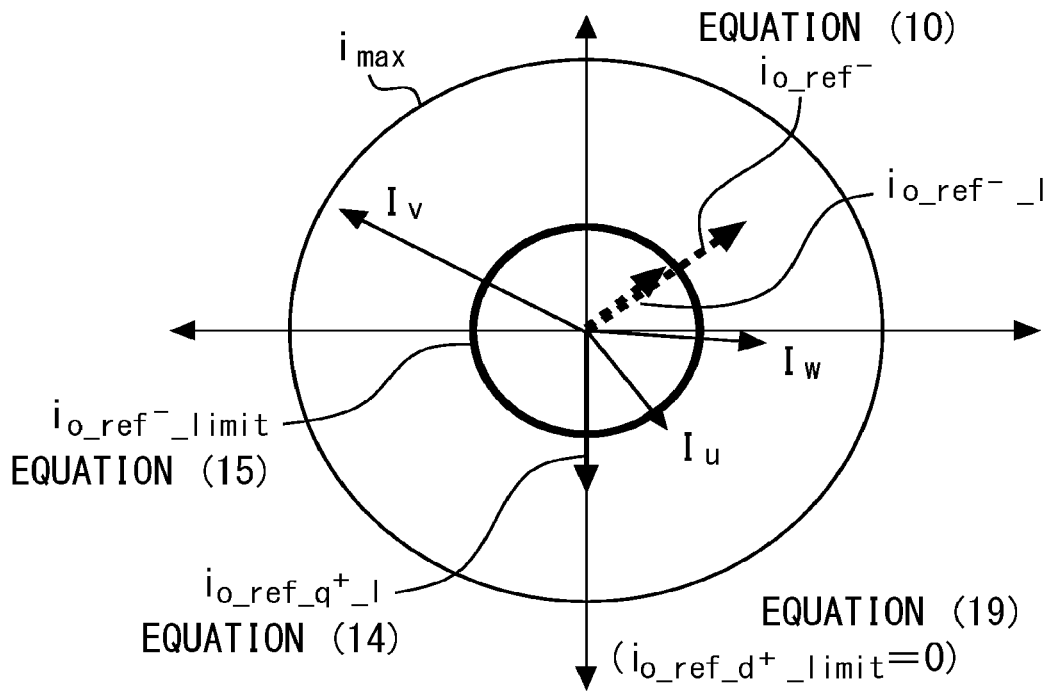
FIG. 9 is a diagram for explaining a first example of a mode P in which the normal phase current is given priority by the control device for the power conversion device according to the first embodiment.

FIG. 9 is a diagram for explaining a first example of the mode P in which the normal phase current is given priority by the control device for the power conversion device according to the first embodiment. FIG. 10 is a diagram for explaining a second example of the mode P in which the normal phase current is given priority by the control device for the power conversion device according to the first embodiment.

The absolute value of the provisional normal phase q-axis current command value $i_{o\_ref\_q+}$ is expressed by Equation (14) below:

[Math. 14]

$$|i_{o\_ref\_q+}| = |-k \times (1 - |v_{o+}|)| \quad (14)$$

The limit value $i_{o\_ref-\_limit}$ is expressed by Equation (15) below:

[Math. 15]

$$i_{o\_ref-\_limit} = i_{max} - |i_{o\_ref\_q+}| \quad (15)$$

The limit value $i_{o\_ref\_d-\_limit}$ is expressed by Equation (16) below:

[Math. 16]

$$i_{o\_ref\_d-\_limit} = \frac{i_{o_{ref}-\_limit}}{|v_{o-}|} \times |v_{o\_q-}| \quad (16)$$

The limit value $i_{o\_ref\_d-\_limit}$ is expressed by Equation (17) below:

[Math. 17]

$$i_{o\_ref\_q-\_limit} = \frac{i_{o\_ref-\_limit}}{|v_{o-}|} \times |v_{o\_d-}| \quad (17)$$

The determined reversed phase current command value $i_{o\_ref-I}$ is expressed by Equation (18) below:

[Math. 18]

$$i_{o\_ref-\_I} = \sqrt{i_{o\_ref\_d-\_I}^2 + i_{o\_ref\_q-\_I}^2} \quad (18)$$

The limit value $i_{o\_ref\_d+\_limit}$ is expressed by Equation (19) below:

[Math. 19]

$$i_{o\_ref\_d+\_limit} = \sqrt{(i_{max} - i_{o\_ref-\_I})^2 - |i_{o\_ref\_q+\_I}|^2} \quad (19)$$
$$= \sqrt{(i_{max} - |i_{o\_ref-\_I}| - |i_{o\_ref\_q+\_I}|)(i_{max} - |i_{o\_ref-\_I}| + |i_{o\_ref\_q+\_I}|)}$$

In the first example of FIG. 9, the absolute value of the provisional reversed phase current command value $i_{o\_ref-}$ is larger than the absolute value of the limit value $i_{o\_ref-\_limit}$. In this case, the absolute value of the determined reversed phase current command value $i_{o\_ref-\_I}$ is limited to the absolute value of the limit value $i_{o\_ref-\_limit}$.

Figure 10:
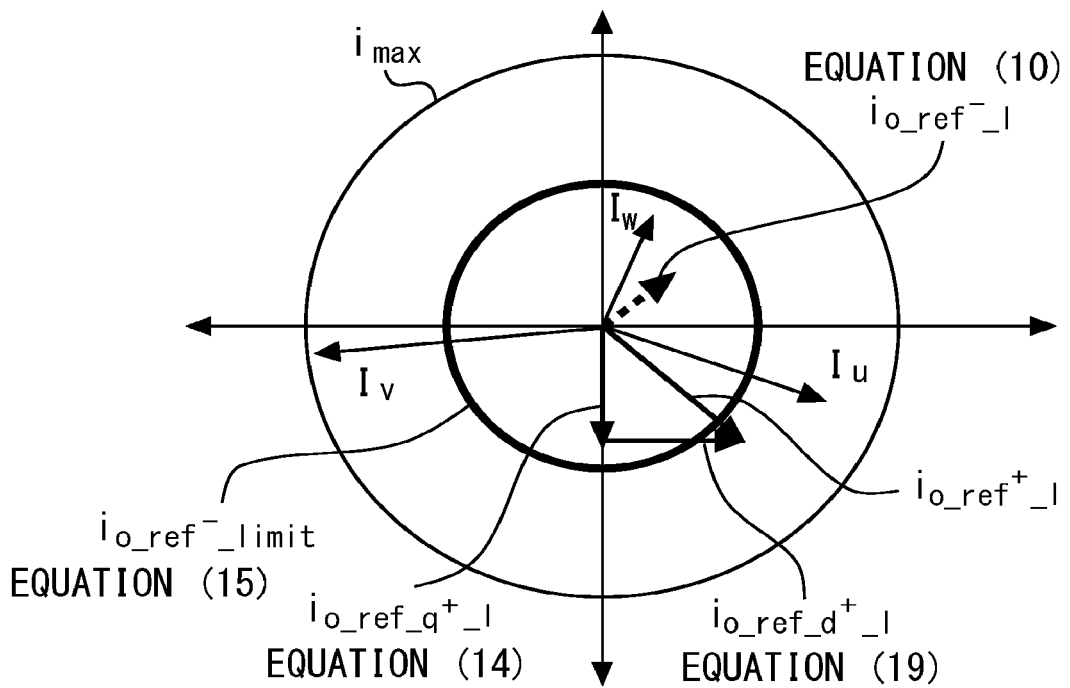
FIG. 10 is a diagram for explaining a second example of the mode P in which the normal phase current is given priority by the control device for the power conversion device according to the first embodiment.

In the second example of FIG. 10, the absolute value of the provisional reversed phase current command value $i_{o\_ref-}$ is smaller than the absolute value of the limit value $i_{o\_ref-\_limit}$. In this case, the absolute value of the determined reversed phase current command value $i_{o\_ref-\_I}$ is not limited to the absolute value of the limit value $i_{o\_ref-\_limit}$. At this time, a determined normal phase current command value $i_{o\_ref+\_I}$ is the sum of the determined normal phase d-axis current command value $i_{o\_ref\_d+\_I}$ and the determined normal phase q-axis current command value $i_{o\_ref\_q+\_I}$.

Next, with reference to FIGS. 11 and 12, a first example of the mode E in which neither the reversed phase current nor the normal phase current is given priority will be described.

Figure 11:
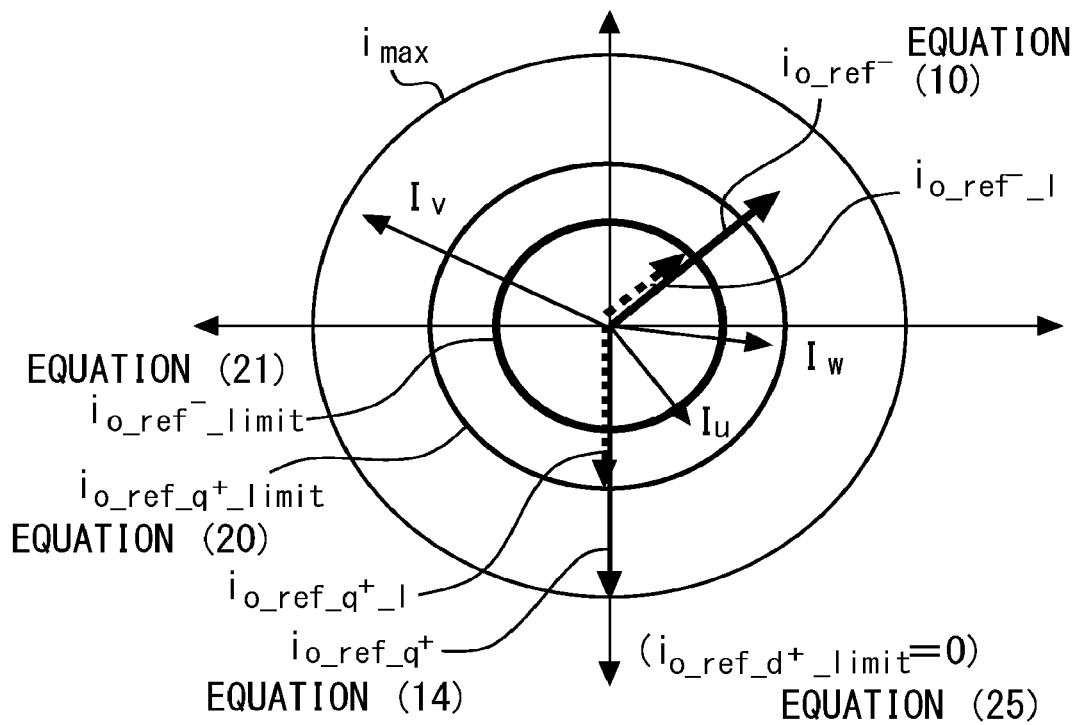
FIG. 11 is a diagram for explaining a first example of a mode E in which neither the reversed phase current nor the normal phase current is given priority by the control device for the power conversion device according to the first embodiment.

FIG. 11 is a diagram for explaining a first example of the mode E in which neither the reversed phase current nor the normal phase current is given priority by the control device for the power conversion device according to the first embodiment. FIG. 12 is a diagram for explaining a second example of the mode E in which neither the reversed phase current nor the normal phase current is given priority by the control device for the power conversion device according to the first embodiment.

The limit value $i_{o\_ref\_q+\_limit}$ is expressed by Equation (20) below:

[Math. 20]

$$i_{o\_ref\_q+\_limit} = |i_{o\_ref\_q+}| \times \frac{i_{max}}{|i_{o\_ref\_q+}| + |i_{o\_ref-}|} \quad (20)$$

The limit value $i_{o\_ref-\_limit}$ is expressed by Equation (21) below:

[Math. 21]

$$i_{o\_ref-\_limit} = |i_{o\_ref-}| \times \frac{i_{max}}{|i_{o\_ref\_q+}| + |i_{o\_ref-}|} \quad (21)$$

The limit value $i_{o\_ref\_d-\_limit}$ is expressed by Equation (22) below:

[Math. 22]

$$i_{o\_ref\_d-\_limit} = \frac{i_{o\_ref-\_limit}}{|v_{o-}|} \times |v_{o\_q-}| \quad (22)$$

The limit value $i_{o\_ref\_d-\_limit}$ is expressed by Equation (23) below:

[Math. 23]

$$i_{o\_ref\_q-\_limit} = \frac{i_{o\_ref-\_limit}}{|v_{o-}|} \times |v_{o\_d-}| \quad (23)$$

The determined reversed phase current command value $i_{o\_ref-\_I}$ is expressed by Equation (23) below:

[Math. 24]

$$i_{o\_ref-\_I} = \sqrt{i_{o\_ref\_d-\_I}^2 + i_{o\_ref\_q-\_I}^2} \quad (24)$$

The limit value $i_{o\_ref\_d+\_limit}$ is expressed by Equation (25) below:

[Math. 25]

$$i_{o\_ref\_d+\_limit} = \sqrt{(i_{max} - i_{o\_ref-\_I})^2 - |i_{o\_ref\_q+\_I}|^2} \quad (25)$$
$$= \sqrt{(i_{max} - |i_{o\_ref-\_I}| - |i_{o\_ref\_q+\_I}|)(i_{max} - |i_{o\_ref-\_I}| + |i_{o\_ref\_q+\_I}|)}$$

In the first example of FIG. 11, the absolute value of the provisional normal phase q-axis current command value $i_{o\_ref\_q+}$ is larger than the absolute value of the limit value $i_{o\_ref\_q+\_limit}$. The absolute value of the provisional reversed phase current command value $i_{o\_ref-}$ is larger than the absolute value of the limit value $i_{o\_ref-\_limit}$. In this case, the absolute value of the determined normal phase q-axis current command value $i_{o\_ref\_q+\_I}$ is limited to the absolute value of the limit value $i_{o\_ref\_q+\_limit}$. The absolute value of the determined reversed phase current command value $i_{o\_ref-\_I}$ is limited to the absolute value of the limit value $i_{o\_ref-\_limit}$.

Figure 12:
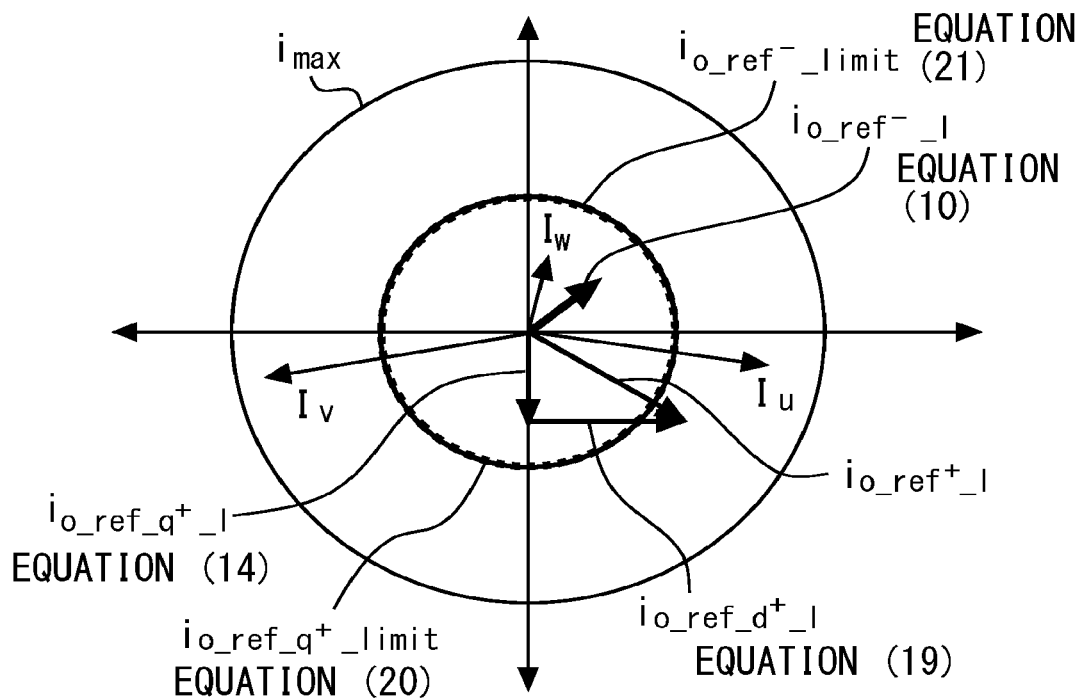
FIG. 12 is a diagram for explaining a second example of the mode E in which neither the reversed phase current nor the normal phase current is given priority by the control device for the power conversion device according to the first embodiment.

In the second example of FIG. 12, the absolute value of the provisional normal phase q-axis current command value $i_{o\_ref\_q+}$ is smaller than the absolute value of the limit value $i_{o\_ref\_q+\_limit}$. The absolute value of the provisional reversed phase current command value $i_{o\_ref-}$ is smaller than the limit value $i_{o\_ref\_q-\_limit}$. In this case, the absolute value of the determined normal phase q-axis current command value $i_{o\_ref\_q+\_J}$ is not limited to the absolute value of the limit value $i_{o\_ref\_q+\_limit}$. At this time, a determined normal phase current command value $i_{o\_ref+\_J}$ is the sum of the determined normal phase d-axis current command value $i_{o\_ref\_d+\_J}$ and the determined normal phase q-axis current command value $i_{o\_ref\_q+\_J}$.

Next, the magnitude of the normal phase current in each mode will be described with reference to FIG. 13.

Figure 13:
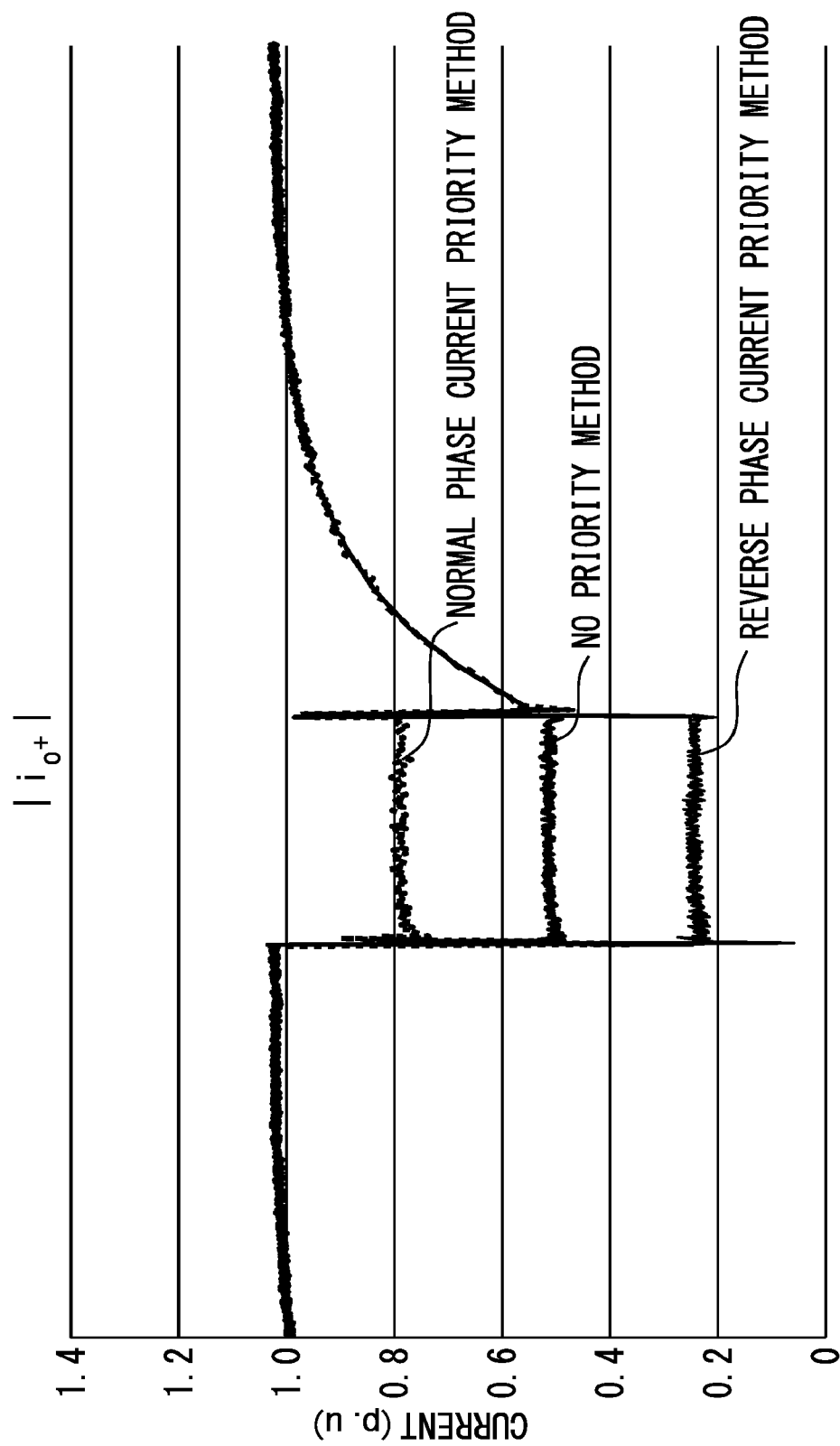
FIG. 13 is a diagram for explaining the magnitude of the normal phase current in each mode of the control device for the power conversion device according to the first embodiment.

FIG. 13 is a diagram for explaining the magnitude of the normal phase current in each mode of the control device for the power conversion device according to the first embodiment.

As shown in FIG. 13, the magnitude of the normal phase current varies depending on the mode. Specifically, the normal phase current becomes maximal when the mode P in which the normal phase current is given priority has been selected. The normal phase current becomes minimal when the mode N in which the reversed phase current is given priority has been selected. When the mode E in which neither the reversed phase current nor the normal phase current is given priority has been selected, the magnitude of the normal phase current is the magnitude between the magnitude of the normal phase current at the time when the mode P in which the normal phase current is given priority has been selected and the magnitude of the normal phase current at the time when the mode N in which the reversed phase current is given priority has been selected.

Next, the magnitude of the reversed phase voltage in each mode will be described with reference to FIG. 14.

Figure 14:
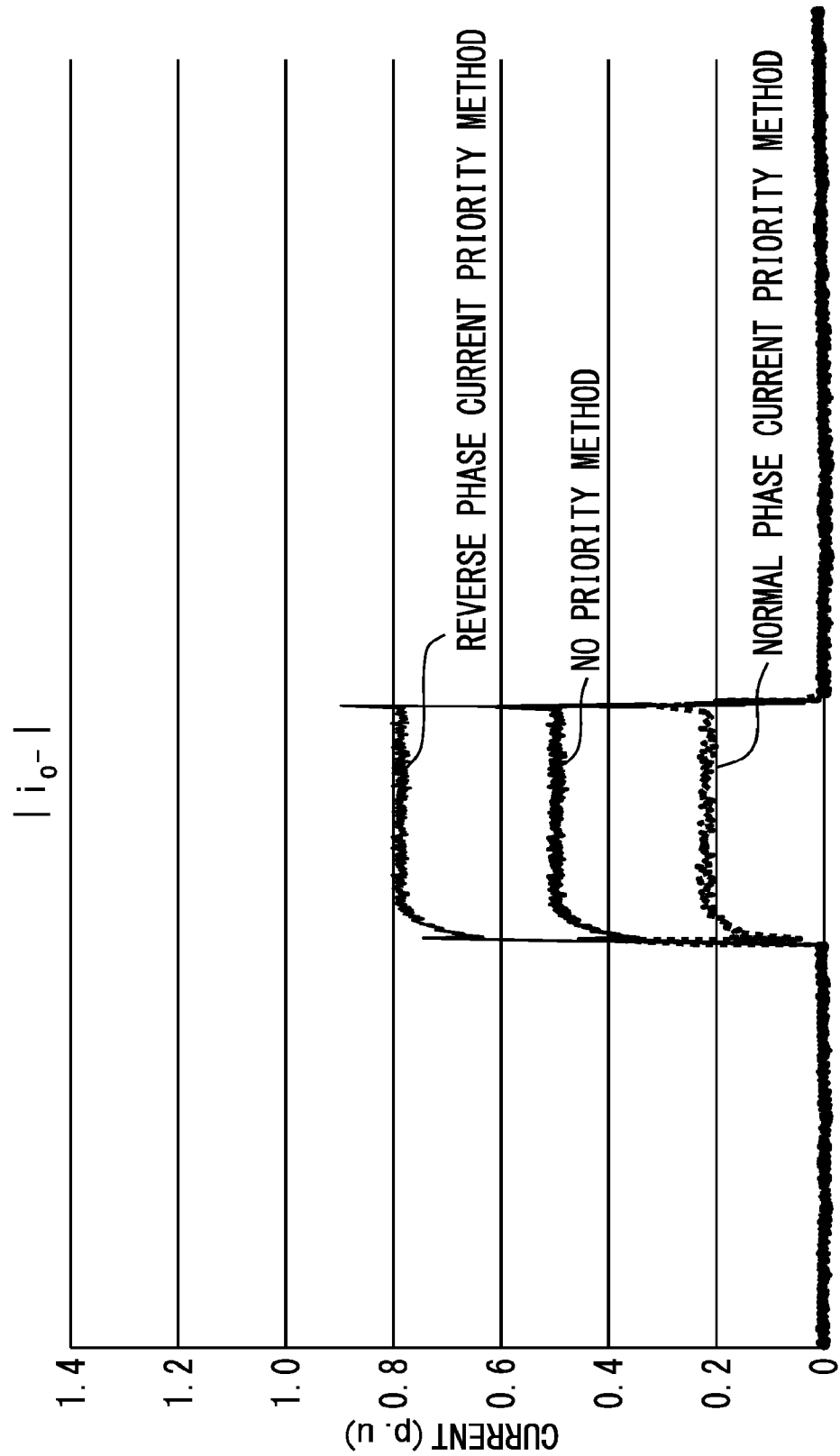
FIG. 14 is a diagram for explaining the magnitude of the reversed phase current in each mode of the control device for the power conversion device according to the first embodiment.

FIG. 14 is a diagram for explaining the magnitude of the reversed phase voltage in each mode of the control device for the power conversion device according to the first embodiment.

As shown in FIG. 14, the magnitude of the reversed phase current varies depending on the mode. Specifically, the reversed phase current becomes maximal when the mode N in which the reversed phase current is given priority has been selected. The reversed phase current becomes minimal when the mode P in which the normal phase current is given priority has been selected. When the mode E in which neither the reversed phase current nor the normal phase current is given priority has been selected, the magnitude of the reversed phase current is the magnitude between the magnitude of the reversed phase current at the time when the mode N in which the reversed phase current is given priority has been selected and the magnitude of the reversed phase current at the time when the mode P in which the normal phase current is given priority has been selected.

Next, the magnitude of the normal phase voltage in each mode will be described with reference to FIG. 15.

Figure 15:
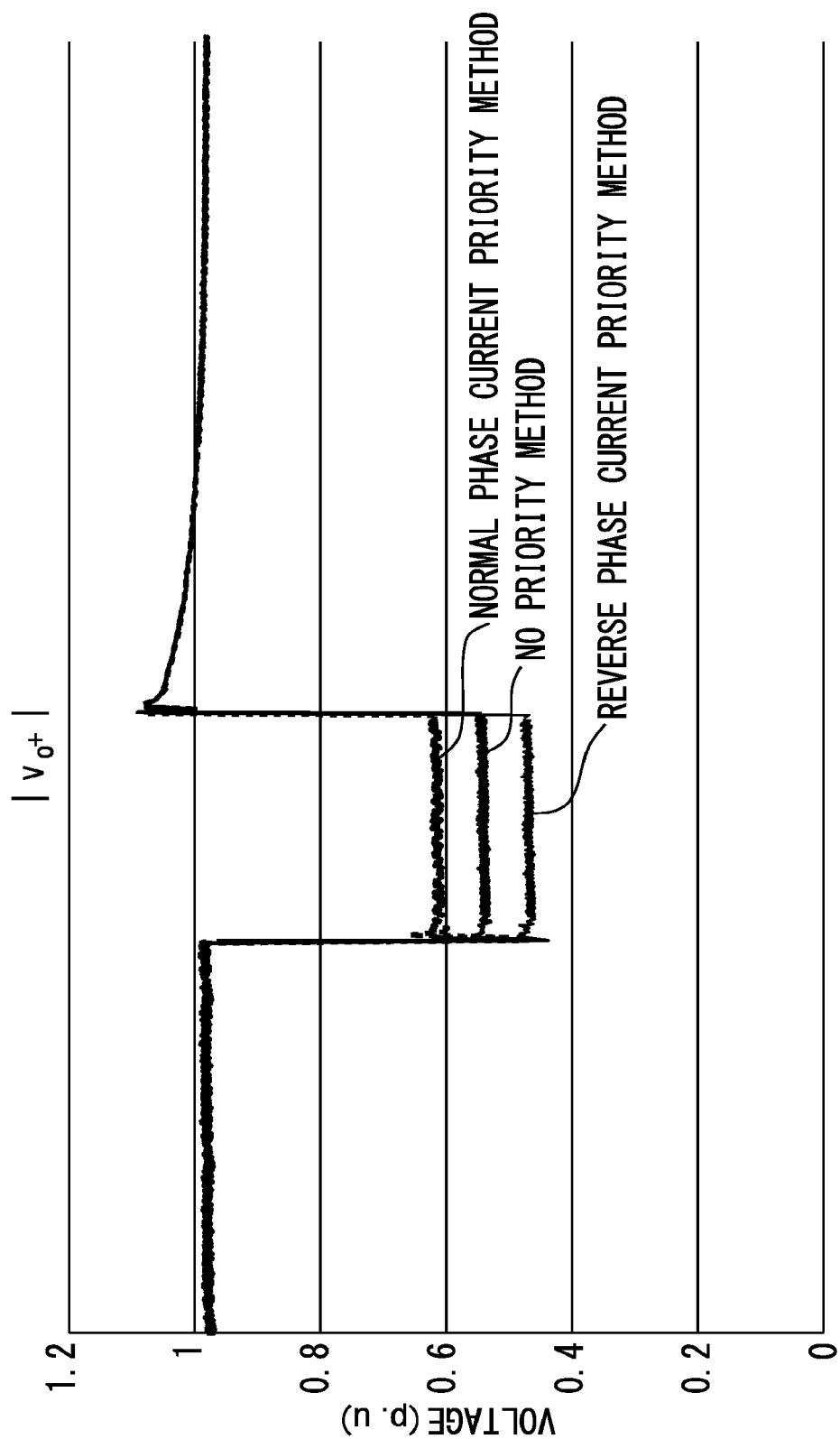
FIG. 15 is a diagram for explaining the magnitude of the normal phase voltage in each mode of the control device for the power conversion device according to the first embodiment.

FIG. 15 is a diagram for explaining the magnitude of the normal phase voltage in each mode of the control device for the power conversion device according to the first embodiment.

As shown in FIG. 15, the magnitude of the normal phase voltage varies depending on the mode. Specifically, the normal phase voltage becomes maximal when the mode P in which the normal phase current is given priority has been selected. The normal phase voltage becomes minimal when the mode N in which the reversed phase current is given priority has been selected. When the mode E in which neither the reversed phase current nor the normal phase current is given priority has been selected, the magnitude of the normal phase current is the magnitude between the magnitude of the normal phase voltage at the time when the mode P in which the normal phase current is given priority has been selected and the magnitude of the normal phase voltage at the time when the mode N in which the reversed phase current is given priority has been selected.

Next, the magnitude of the reversed phase voltage in each mode will be described with reference to FIG. 16.

Figure 16:
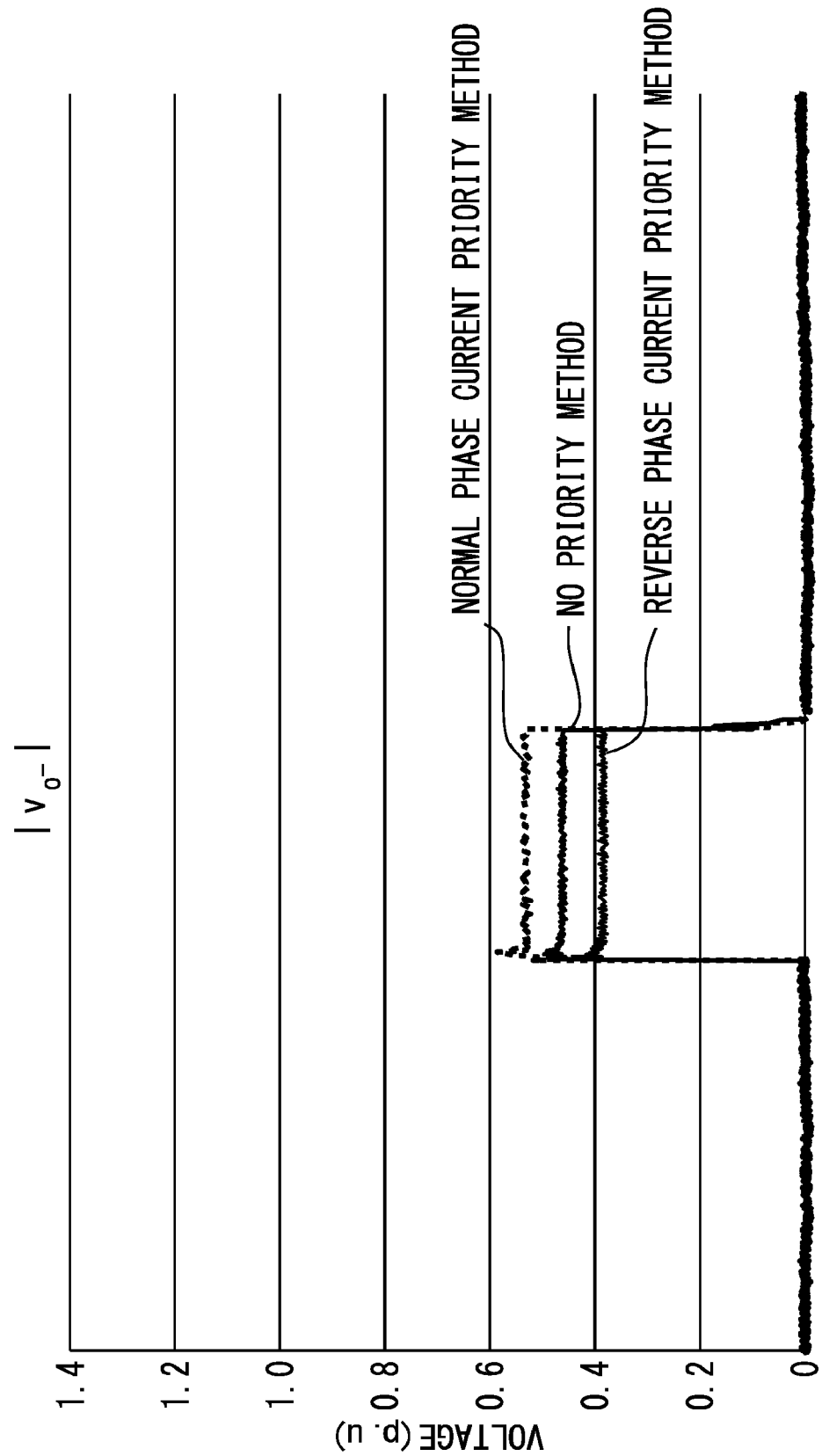
FIG. 16 is a diagram for explaining the magnitude of the reversed phase voltage in each mode of the control device for the power conversion device according to the first embodiment.

FIG. 16 is a diagram for explaining the magnitude of the reversed phase voltage in each mode of the control device for the power conversion device according to the first embodiment.

As shown in FIG. 16, the magnitude of the reversed phase voltage varies depending on the mode. Specifically, the reversed phase voltage becomes maximal when the mode P in which the normal phase current is given priority has been selected. The reversed phase voltage becomes minimal when the mode N in which the reversed phase current is given priority has been selected. When the mode E in which neither the reversed phase current nor the normal phase current is given priority has been selected, the magnitude of the reversed phase current is the magnitude between the magnitude of the reversed phase voltage at the time when the mode P in which the normal phase current is given priority has been selected and the magnitude of the reversed phase voltage at the time when the mode N in which the reversed phase current is given priority has been selected.

According to the first embodiment described above, the control device 7 controls the power converter on the basis of the determined normal phase d-axis current command value, the determined normal phase q-axis current command value, the determined reversed phase d-axis current command value, and the determined reversed phase q-axis current command value obtained from the provisional normal phase d-axis current command value, the provisional normal phase q-axis current command value, the provisional reversed phase d-axis current command value, and the provisional reversed phase q-axis current command value, respectively, within the limit value. Therefore, the voltage of the system can be properly compensated for when an unbalanced short circuit occurs. Specifically, the voltage of the system can be compensated for so that the AC-side current value of the power converter 3 does not exceed the rated current value.

The control device 7 changes the limit value in accordance with each mode. Therefore, depending on the situation, the voltage of the system can be compensated for so that the AC-side current value of the power converter 3 does not exceed the rated current value.

Next, with reference to FIG. 17, an example of the control device 7 will be described.

Figure 17:
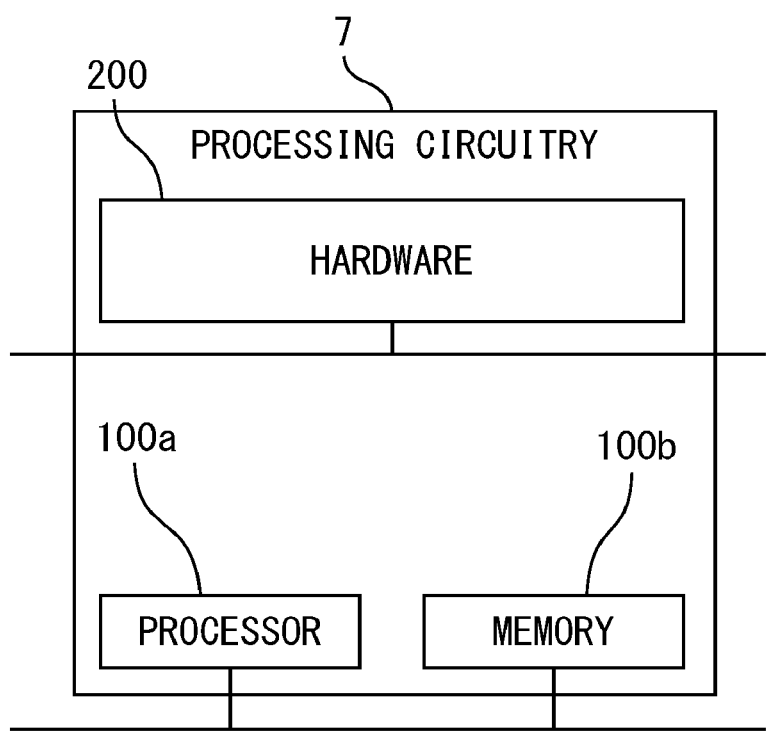
FIG. 17 is a hardware configuration diagram of the control device for the power conversion device according to the first embodiment.

FIG. 17 is a hardware configuration diagram of the control device for the power conversion device according to the first embodiment.

Each function of the control device 7 can be realized by processing circuitry. For example, the processing circuitry includes at least one processor 100a and at least one memory 100b. For example, the processing circuitry includes at least one dedicated hardware 200.

When the processing circuitry includes at least one processor 100a and at least one memory 100b, each function of the control device 7 is realized by software, firmware, or a combination of the software and the firmware. At least one of the software and the firmware is described as a program. At least one of the software and the firmware is stored into at least one memory 100b. At least one processor 100a reads out and executes the program stored in at least one memory 100b, thereby realizing each function of the control device 7. At least one processor 100a is also referred to as a central processing unit, a processing unit, an arithmetic unit, a microprocessor, a microcomputer, or a digital signal processor (DSP). For example, at least one memory 100b may be a non-volatile or volatile semiconductor memory, such as random-access memory (RAM), read-only memory (ROM), flash memory, erasable programmable ROM (EPROM), or electrically erasable programmable ROM (EEPROM), a magnetic disk, a flexible disk, an optical disk, a compact disk, a mini-disk, a digital versatile disc (DVD), or the like.

When the processing circuitry includes at least one dedicated hardware 200, the processing circuitry is realized by, for example, a single circuit, a composite circuit, a programmed processor, a parallel programmed processor, an application-specific integrated circuit (ASIC), a field-programmable gate array (FPGA), or a combination thereof. For example, the functions of the control device 7 are each realized by the processing circuitry. For example, the functions of the control device 7 are collectively realized by the processing circuitry.

Some of the functions of the control device 7 may be realized by the dedicated hardware 200, and the others may be realized by the software or the firmware. For example, the function of the controller 15 may be realized by the processing circuitry as the dedicated hardware 200, and functions except for the function of the controller 15 may be realized by at least one processor 100a reading and executing the program stored in at least one memory 100b.

In this manner, the processing circuitry realizes each function of the control device 7 by the hardware 200, the software, the firmware, or a combination thereof.

INDUSTRIAL APPLICABILITY

As described above, the control device for the power conversion device of the present disclosure can be used for a power conversion system.

REFERENCE SIGNS LIST

1 DC Power Supply
2 Power conversion device
3 Power converter
4 Filter reactor
5 Filter capacitor
6 PLL Circuit
7 Control device
8 First conversion unit
9 Second conversion unit
10 Current command value generator
11 First limiter
12 Second limiter
13 Third limiter
14 Fourth limiter
15 Controller
16 First subtractor
17 First multiplier
18 First adder
19 First divider
20 First selector
21 First inverter
22 Second subtractor
23 Second multiplier
24 Second adder
25 Second divider
26 Second selector
27 Third divider
28 First absolute value calculator
29 Third multiplier
30 Second inverter
31 Fourth divider
32 Second absolute value calculator
33 Fourth multiplier
34 Third inverter
35 Fifth multiplier
36 Sixth multiplier
37 Third adder
38 First square root calculator
39 Third subtractor
40 Fourth adder
41 Fourth subtractor
42 Fourth subtractor
43 Second square root calculator
100a Processor
100b Memory
200 Hardware

The invention claimed is:

1. A control device for a power conversion device, the control device comprising:
a first conversion unit configured to convert a detected value of alternating current (AC)-side current in a power converter that converts direct current (DC) power into AC power into a normal phase d-axis current value and a reversed phase d-axis current value;
a second conversion unit configured to convert a detected value of AC-side voltage in the power converter into a normal phase d-axis voltage value and a reversed phase d-axis voltage value;
a current command value generator configured to generate a provisional normal phase d-axis current command value, a provisional normal phase q-axis current command value, a provisional reversed phase d-axis current command value, and a provisional reversed phase q-axis current command value on a basis of a detected value of DC-side voltage and a detected value of DC-side current of the power converter, the normal phase d-axis current value and the reversed phase d-axis current value from the first conversion unit, and the normal phase d-axis voltage value and the reversed phase d-axis voltage value from the second conversion unit, so as to compensate for the AC-side voltage of the power converter; and
a limiter configured to respectively set limit values of a provisional normal phase d-axis current command value, a provisional normal phase q-axis current command value, a provisional reversed phase d-axis current command value, and a provisional reversed phase q-axis current command value that are generated by the current command value generator so that the AC-side current value of the power converter does not exceed a preset value; and
a controller configured to control the power converter within the limit values set by the limiter on a basis of a determined normal phase d-axis current command value, a determined normal phase q-axis current command value, a determined reversed phase d-axis current command value, and a determined reversed phase q-axis current command value that are obtained from the provisional normal phase d-axis current command value, the provisional normal phase q-axis current command value, the provisional reversed phase d-axis current command value, and the provisional reversed phase q-axis current command value, respectively.

2. The control device for the power conversion device according to claim 1, wherein the limiter sets a limit value of the provisional normal phase q-axis current command value on a basis of a provisional reversed phase current command value obtained from the provisional reversed phase d-axis current command value and the provisional reversed phase q-axis current command value, the provisional normal phase q-axis current command value, and a rated current value, the limiter setting a limit value of the provisional reversed phase d-axis current command value on a basis of the provisional reversed phase current command value, the provisional normal phase q-axis current command value, and the rated current value, the limiter setting a limit value of the provisional reversed phase q-axis current command value on a basis of the provisional reversed phase current command value, the provisional normal phase q-axis current command value, and the rated current value, the limiter setting a limit value of the provisional normal phase d-axis current command value on a basis of the determined normal phase q-axis current command value, the determined reversed phase d-axis current command value, and the determined reversed phase q-axis current command value.

3. The control device for the power conversion device according to claim 1, wherein the limiter limits the provisional normal phase q-axis current command value without limiting the provisional reversed phase d-axis current command value and the provisional reversed phase q-axis current command value.

4. The control device for the power conversion device according to claim 1, wherein the limiter limits a provisional reversed phase current command value obtained from the provisional reversed phase d-axis current command value and the provisional reversed phase q-axis current command value without limiting the provisional normal phase q-axis current command value.

5. The control device for the power conversion device according to claim 1, wherein the limiter limits the provisional reversed phase d-axis current command value, the provisional reversed phase q-axis current command value, and the provisional reversed phase current command value obtained from the provisional reversed phase d-axis current command value and the provisional reversed phase q-axis current command value.

6. The control device for the power conversion device according to claim 1, wherein the limiter is provided to be able to select any one of
 a mode for limiting the provisional normal phase q-axis current command value without limiting the provisional reversed phase d-axis current command value or the provisional reversed phase q-axis current command value,
 a mode for limiting the provisional reversed phase current command value obtained from the provisional reversed phase d-axis current command value and the provisional reversed phase q-axis current command value without limiting the provisional normal phase q-axis current command value, and
 a mode for limiting the provisional reversed phase d-axis current command value, the provisional reversed phase q-axis current command value, and the provisional reversed phase current command value.

* * * * *